（12）United States Patent
Muto

(10) Patent No.: US 10,126,907 B2
(45) Date of Patent: Nov. 13, 2018

(54) EMULATION OF MULTIFUNCTION PERIPHERAL VIA REMOTE CONTROL DEVICE BASED ON DISPLAY ASPECT RATIOS

(71) Applicant: Konica Minolta Inc., Chiyoda-ku (JP)

(72) Inventor: Hikaru Muto, Takarazuka (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 616 days.

(21) Appl. No.: 14/572,856

(22) Filed: Dec. 17, 2014

(65) Prior Publication Data

US 2015/0169197 A1   Jun. 18, 2015

(30) Foreign Application Priority Data

Dec. 18, 2013   (JP) .................................. 2013-260917

(51) Int. Cl.
*G06F 3/0481* (2013.01)
*G06F 3/14* (2006.01)
(Continued)

(52) U.S. Cl.
CPC .......... *G06F 3/0481* (2013.01); *G06F 3/1454* (2013.01); *G06F 9/451* (2018.02); *G06F 2200/1614* (2013.01); *G09G 5/00* (2013.01); *G09G 2340/0407* (2013.01); *G09G 2340/0442* (2013.01); *G09G 2340/0464* (2013.01); *G09G 2340/0492* (2013.01); *G09G 2370/04* (2013.01)

(58) Field of Classification Search
CPC .... G06F 3/0481; G06F 3/1454; G06F 9/4443;
G06F 2200/1614; G06F 9/451; G09G 2340/0407; G09G 2340/0442; G09G 2340/0464; G09G 2370/04
See application file for complete search history.

(56) References Cited

U.S. PATENT DOCUMENTS

2002/0051208 A1* 5/2002 Venable ................. H04N 1/387
358/1.18
2004/0257259 A1* 12/2004 Jindal .................... G08C 17/02
341/176
(Continued)

FOREIGN PATENT DOCUMENTS

| JP | 2012-93940 A | 5/2012 |
|---|---|---|
| JP | 2012-199799 A | 10/2012 |
| JP | 2013-161375 A | 8/2013 |

OTHER PUBLICATIONS

Knight, Kayla, "Responsive Web Design: What It Is and How to Use It," Jan. 12, 2011, retrieved from http://www.smashingmagazine.com/2011/01/12/guidelines-for-responsive-web-design. (44 pages).*

*Primary Examiner* — Eric J. Bycer
(74) *Attorney, Agent, or Firm* — Buchanan Ingersoll & Rooney PC

(57) ABSTRACT

A screen generation device includes a controller configured to: determine one of a vertical direction and a horizontal direction to be a reference direction; generate a size-changed screen; generate a hard key screen; generate a remote operation screen; determine a first area and a second area; arrange the size-changed screen in the first area and the hard key screen in the second area; and arrange the soft key images in the hard key screen of the same size as the second area.

15 Claims, 29 Drawing Sheets

(51) Int. Cl.
 *G09G 5/00* (2006.01)
 *G06F 9/451* (2018.01)

(56) References Cited

U.S. PATENT DOCUMENTS

| | | | |
|---|---|---|---|
| 2005/0097444 A1* | 5/2005 | Ivarsey | G06F 17/30905 715/255 |
| 2006/0290680 A1* | 12/2006 | Tanaka | H04N 1/00204 345/173 |
| 2007/0008583 A1* | 1/2007 | Araki | G06F 8/20 358/1.15 |
| 2009/0089660 A1* | 4/2009 | Atkins | G06F 9/4443 715/243 |
| 2009/0150794 A1* | 6/2009 | Sano | G08C 17/00 715/740 |
| 2009/0183109 A1* | 7/2009 | Dan | G06F 9/4443 715/788 |
| 2009/0191854 A1* | 7/2009 | Beason | H04M 1/04 455/418 |
| 2009/0237420 A1* | 9/2009 | Lawrenz | G06F 1/1601 345/649 |
| 2010/0156939 A1* | 6/2010 | Lee | G06F 1/1626 345/650 |
| 2011/0102299 A1* | 5/2011 | Hochmuth | G06F 3/1438 345/1.2 |
| 2012/0089946 A1* | 4/2012 | Fukui | G08C 17/00 715/822 |
| 2013/0080945 A1* | 3/2013 | Reeves | G06F 3/1438 715/761 |
| 2013/0194289 A1* | 8/2013 | Snow | G09G 5/14 345/581 |
| 2013/0203490 A1* | 8/2013 | Hilbert | G07F 17/3225 463/30 |
| 2013/0275864 A1* | 10/2013 | William | G06F 17/211 715/244 |
| 2014/0059424 A1* | 2/2014 | Kim | G06F 17/212 715/235 |
| 2014/0062874 A1* | 3/2014 | Suggs | G06F 3/0325 345/158 |
| 2014/0223314 A1* | 8/2014 | Pinto | G06F 1/1694 715/733 |
| 2014/0368547 A1* | 12/2014 | Elings | G06T 3/60 345/659 |

\* cited by examiner

| MAIN GROUP | SUBGROUP | KEY | ARRAY DIRECTION | PRIORITY | SUB-PRIORITY | SUB-ARRAY DIRECTION |
|---|---|---|---|---|---|---|
| FIRST GROUP | – | 411 TO 416 | VERTICAL DIRECTION | 3 | – | – |
| SECOND GROUP | FIRST SUBGROUP | 421A | HORIZONTAL DIRECTION | 1 | 5 | VERTICAL DIRECTION |
| | SECOND SUBGROUP | 422A, 422A, 422C | | | 1 | |
| | THIRD SUBGROUP | 423A, 423A, 423C | | | 2 | |
| | FOURTH SUBGROUP | 424A, 424A, 424C | | | 3 | |
| | FIFTH SUBGROUP | 425A, 425A, 425C | | | 4 | |
| | SIXTH SUBGROUP | 426A | | | 6 | |
| | SEVENTH SUBGROUP | 427A | | | 7 | |
| THIRD GROUP | – | 431, 432, 433 | HORIZONTAL DIRECTION | 4 | – | – |
| FOURTH GROUP | – | 441, 442, 443 | HORIZONTAL DIRECTION | 2 | – | – |
| – | – | 451 | – | – | – | – |

EMULATION OF MULTIFUNCTION PERIPHERAL VIA REMOTE CONTROL DEVICE BASED ON DISPLAY ASPECT RATIOS

The entire disclosure of Japanese Patent Application No. 2013-260917 filed on Dec. 18, 2013 including description, claims, drawings, and abstract are incorporated herein by reference in its entirety.

BACKGROUND OF THE INVENTION

Field of the Invention

The present invention relates to a screen generation device, a remote operation device, a remote control device, a screen generation method, and a screen generation program, and in particular to a screen generation device configured to generate a remote control screen for controlling a remote control device, a remote operation device and a remote control device including the screen generation device, a screen generation method executed in the screen generation device, and a screen generation program.

Description of the Related Art

In recent years, technologies for remotely operating a multifunction peripheral (hereinafter referred to as an "MFP") by a portable information device such as a smart phone or a tablet terminal have been known. An operation screen for operating an MFP is displayed on the portable information device and the MFP can be remotely operated by the portable information device. For example, JP 2012-93940 A discloses a remote operation system in which an operated terminal includes: a display screen control unit configured to generate a portable terminal screen obtained by modifying an operated terminal screen on the basis of display attribute information of a portable terminal; an encoding unit configured to encoding the portable terminal screen by an encoding method received from the portable terminal; and an operation processing unit configured to carry out operation specified by position information received by the portable terminal, and the portable terminal includes a decoding unit configured to decode the encoded portable terminal screen and output the decoded portable screen to a touch screen; and a position information correction unit configured to correct position information indicating a touch position on the portable terminal screen to position information on the operated terminal screen on the basis of the display attribute information of the portable terminal and display attributed information of the operated terminal received from the operated terminal when a touch operation on the touch screen on which the portable terminal screen is displayed is detected.

An MFP, however, has hard keys made of contact switches such as a start key, and operations corresponding to pressing of the hard keys have to be associated with pressing of hard keys of a portable information device so that the operations are received by the portable information device. Thus, a program for remotely operating the MFP has to be installed in the portable information device. Since hard keys of MFPs may be different for different models of MFPs, there is a problem that programs compliant with the respective models have to be installed in the portable information device.

SUMMARY OF THE INVENTION

The present invention has been made to solve the aforementioned problems, and one of objects thereof is to provide a screen generation device capable of generating a remote operation screen including a hard key screen associated with hard keys.

Another object of the present invention is to provide a remote operation device capable of generating a remote operation screen including a hard key screen associated with hard keys.

Still another object of the present invention is to provide a remote control device capable of generating a remote operation screen including a hard key screen associated with hard keys.

Still another object of the present invention is to provide a screen generation method capable of generating a remote operation screen including a hard key screen associated with hard keys.

Still another object of the present invention is to provide a screen generation program capable of generating a remote operation screen including a hard key screen associated with hard keys.

To achieve at least one of the above-mentioned objects, according to an aspect, a screen generation device reflecting one aspect of the present invention includes a controller configured to: determine one of a vertical direction and a horizontal direction to be a reference direction on the basis of an aspect ratio of a display surface of a first display unit and an aspect ratio of a display surface of a second display unit; generate a size-changed screen by changing a size in a dependent direction of an operation screen to be displayed on the first display unit, the dependent direction being a direction different from the determined reference direction of the vertical direction and the horizontal direction; generate a hard key screen in which one or more soft key images associated with one or more hard keys, respectively, are arranged on the basis of hard key information on the one or more hard keys; generate a remote operation screen in which the size-changed screen and the hard key screen are arranged; determine a first area on the basis of the size-changed screen of the remote operation screen and determine an area other than the first area to be a second area; arrange the size-changed screen in the first area and the hard key screen in the second area; and arrange one or more soft key images in the hard key screen of the same size as the second area.

To achieve at least one of the above-mentioned objects, according to an aspect, a screen generation method executed by a screen generation device reflecting one aspect of the present invention includes: determining one of a vertical direction and a horizontal direction to be a reference direction on the basis of an aspect ratio of a display surface of a first display unit and an aspect ratio of a display surface of a second display unit; acquiring an operation screen to be displayed on the first display unit; generating a size-changed screen by changing a size in a dependent direction of the acquired operation screen, the dependent direction being a direction different from the determined reference direction of the vertical direction and the horizontal direction; acquiring key information on one or more hard keys; generating a hard key screen in which one or more soft key images associated with the one or more hard keys, respectively, are arranged on the basis of the acquired hard key information; generating a remote operation screen in which the size-changed screen and the hard key screen are arranged; determining a first area on the basis of the size-changed screen of the remote operation screen and determining an area other than the first area to be a second area; arranging the size-changed screen in the first area and the hard key screen in the second area; and arranging one or more soft key images in the hard key screen of the same size as the second area.

According to this aspect, a screen generation method capable of generating a remote operation screen including a hard key screen associated with hard keys can be provided.

To achieve at least one of the above-mentioned objects, according to an aspect, a non-transitory recording medium storing a computer readable program which generates a screen and is executed by a computer configured to control a screen generation device, the program causing the computer to execute the steps of: determining one of a vertical direction and a horizontal direction to be a reference direction on the basis of an aspect ratio of a display surface of a first display unit and an aspect ratio of a display surface of a second display unit; acquiring an operation screen to be displayed on the first display unit; generating a size-changed screen by changing a size in a dependent direction of the acquired operation screen, the dependent direction being a direction different from the determined reference direction of the vertical direction and the horizontal direction; acquiring key information on one or more hard keys; generating a hard key screen in which one or more soft key images associated with the one or more hard keys, respectively, are arranged on the basis of the acquired hard key information; generating a remote operation screen in which the size-changed screen and the hard key screen are arranged; determining a first area on the basis of the size-changed screen of the remote operation screen and determining an area other than the first area to be a second area; arranging the size-changed screen in the first area and the hard key screen in the second area; and arranging one or more soft key images in the hard key screen of the same size as the second area.

According to this aspect, a screen generation program capable of generating a remote operation screen including a hard key screen associated with hard keys can be provided.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 8 is a table showing an example of the hard key information;

DESCRIPTION OF THE PREFERRED EMBODIMENTS

Figure 1:
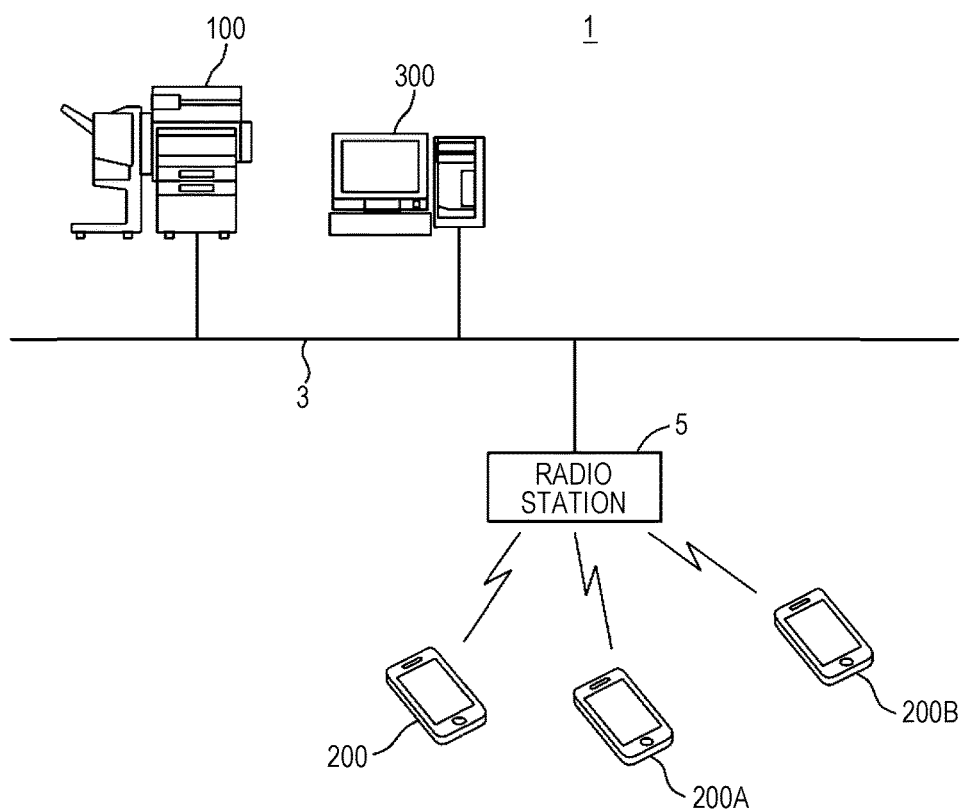
FIG. 1 is a diagram showing a general outline of a printing system according to one of embodiments of the present invention.

Hereinafter, an embodiment of the present invention will be described with reference to the drawings. However, the scope of the invention is not limited to the illustrated examples.

In the following description, the same components will be designated by the same reference numerals. The same applies to the names and the functions of the components. Thus, detailed description of the components will not be repeated.

First Embodiment

FIG. 1 is a diagram showing a general outline of a printing system according to one of embodiments of the present invention. In FIG. 1, a printing system 1 includes a multifunction peripheral (hereinafter referred to as an "MFP") 100 that functions as an image processing apparatus, a personal computer (hereinafter referred to as a "PC") 300, a radio station 5, and portable information devices 200, 200A, 200B. The MFP 100 and the PC 300 are connected to a network 3. The portable information devices 200, 200A, 200B are connected to the network 3 via the radio station 5.

The network 3 is a local area network (LAN), and the connection may be made either in a wired or wireless manner. The network 3 is not limited to a LAN, but may be a wide area network (WAN), a public switched telephone network (PSTN), the Internet, or the like.

The PC 300 is a general computer. The PC 300 has a printer driver program for the MFP 100 installed therein, and can control the MFP 100 by executing the printer driver program to make the MFP 100 to carry out an image forming process, an original reading process, etc.

The portable information devices 200, 200A, 200B are computers that are carried for use by users such as smart phones and PDAs (personal digital assistants). Since the portable information devices 200, 200A, 200B have the same hardware configuration and functions, the portable information device 200 will be described herein unless otherwise stated. Herein, the portable information device 200 is a smart phone that has a wireless LAN function and a speech function. The portable information device 200 can thus make a call by connecting to a mobile phone network through radio communication with a base station for mobile phones.

In the printing system 1 according to the present embodiment, each of the portable information devices 200, 200A, 200B remotely controls the MFP 100. In this case, each of the portable information devices 200, 200A, 200B functions as a remote operation device configured to remotely operating the MFP 100, and the MFP 100 functions as a remote control device that is remotely operated by each of the portable information devices 200, 200A, 200B. Herein, an example in which the portable information device 200 remotely controls the MFP 100 will be described. In this case, a remote operation program for remotely controlling the MFP 100 is installed in the portable information device 200. The remote operation program may be a special application program developed for the MFP 100 or may be a browsing program when the MFP 100 functions as a web server.

When a remote operation is input by a user operating the portable information device 200, the portable information device 200 transmits a remote control command to the MFP 100. The MFP 100 has installed therein a remote control program for receiving a remote control command from the portable information device 200 and executing processes according to the received remote control command.

Although an example in which the remote operation program for remotely controlling the MFP 100 is installed in the portable information device 200 will be described in the present embodiment, the remote operation program for remotely controlling the MFP 100 may be installed in the PC 300. In this case, the user can remotely control the MFP 100 by using the PC 300 similarly to the case in which the user remotely controls the MFP 100 by using the portable information device 200.

Figure 2:
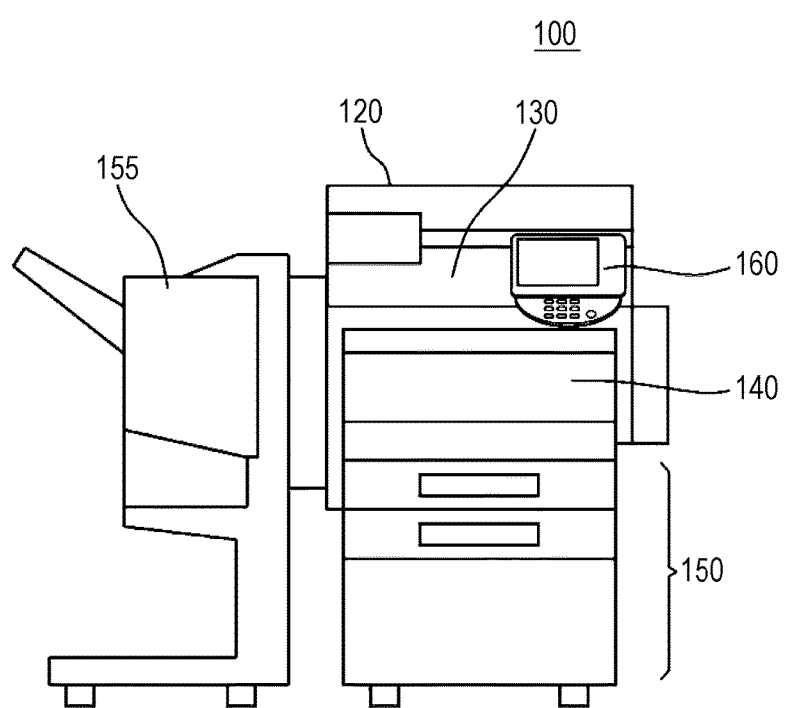
FIG. 2 is a perspective view showing an overview of an MFP.
Figure 3:
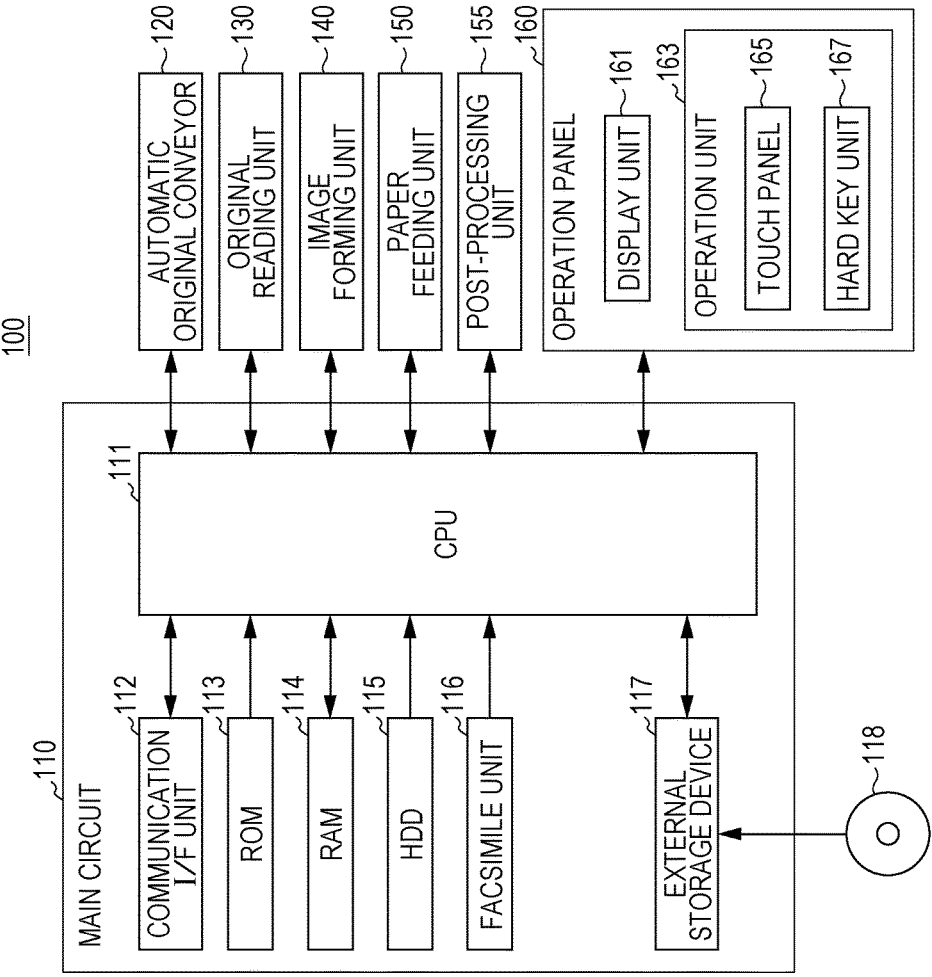
FIG. 3 is a block diagram showing an outline of a hardware configuration of the MFP.

FIG. 2 is a perspective view showing an overview of the MFP. FIG. 3 is a block diagram showing an outline of a hardware configuration of the MFP. In FIGS. 2 and 3, the MFP 100 includes a main circuit 110, an original reading unit 130 for reading originals, an automatic original conveyor 120 for conveying originals to the original reading unit 130, an image forming unit 140 for forming images on paper or the like on the basis of image data output by the original reading unit 130 that has read originals, a paper feeding unit 150 for feeding paper to the image forming unit 140, a post-processing unit 155 configured to process paper on which an image is formed, and an operation panel 160 that is a user interface.

The post-processing unit 155 executes a sorting process of rearranging and discharging one or more sheets of paper on which images are formed by the image forming unit 140, a punching process of making punched holes, and a stapling process of driving staples.

The main circuit 110 includes a CPU 111, a communication interface (I/F) unit 112, a ROM 113, a RAM 114, a hard disk drive (HDD) 115 that is a mass storage device, a facsimile unit 116, and an external storage device 117 on which a CD-ROM 118 is mounted. The CPU 111 is connected to the automatic original conveyor 120, the original reading unit 130, the image forming unit 140, the paper feeding unit 150, the post-processing unit 155, and the operation panel 160, and controls the entire MFP 100.

The ROM 113 stores programs to be executed by the CPU 111 and data necessary for executing the programs. The RAM 114 is used as a work area for executing programs by the CPU 111. The RAM 114 further includes a set value storage area and a setting screen storage area. The set value storage area is an area for storing set values for executing processes. The setting screen storage area is an area for storing setting screens to be displayed on the display unit 161. The RAM 114 also temporarily stores read data (image data) continuously transmitted from the original reading unit 130.

The communication I/F unit 112 is an interface for connecting the MFP 100 to the network 3. The CPU 111 communicates with the PC 300 or the portable information devices 200, 200A, 200B to transmits/received data via the communication I/F unit 112. The communication I/F unit 112 can communicate with a computer connected to the Internet via the network 3.

The facsimile unit 116 is connected to a public switched telephone network (PSTN), and transmits facsimile data to the PSTN or receives facsimile data from the PSTN. The facsimile unit 116 stores the received facsimile data in the HDD 115 or outputs the received facsimile data to the image forming unit 140. The image forming unit 140 prints the facsimile data received by the facsimile unit 116 on a sheet of paper. The facsimile unit 116 also converts data stored in the HDD 115 into facsimile data and transmits the facsimile data to a facsimile machine connected to the PSTN.

The CD-ROM (compact disk ROM) 118 is mounted on the external storage device 117. The CPU 111 can access the CD-ROM 118 via the external storage device 117. The CPU 111 loads programs recorded on the CD-ROM 118 mounted on the external storage device 117 into the RAM 114 and executes the programs. The medium storing the programs to be executed by the CPU 111 is not limited to the CD-ROM 118, but may be an optical disc (MO: magnetic optical disc, MD: mini disc, DVD: digital versatile disc), an IC card, an optical card, and a semiconductor memory such as a mask ROM, an EPROM (erasable programmable ROM), and an EEPROM (electrically EPROM).

Furthermore, the programs to be executed by the CPU 111 is not limited to those recorded on the CD-ROM 118, but programs stored in the HDD 115 may be loaded into the RAM 114 and executed therein. In this case, another computer connected to the network 3 may rewrite a program stored in the HDD 115 of the MFP 100 or may additionally write a new program thereinto. Furthermore, the MFP 100 may download a program from another computer connected to the network 3 and store the program into the HDD 115. Programs used herein include not only programs that can be directly executed by the CPU 111 but also source programs, compressed programs, encrypted programs, and the like.

Figure 4:
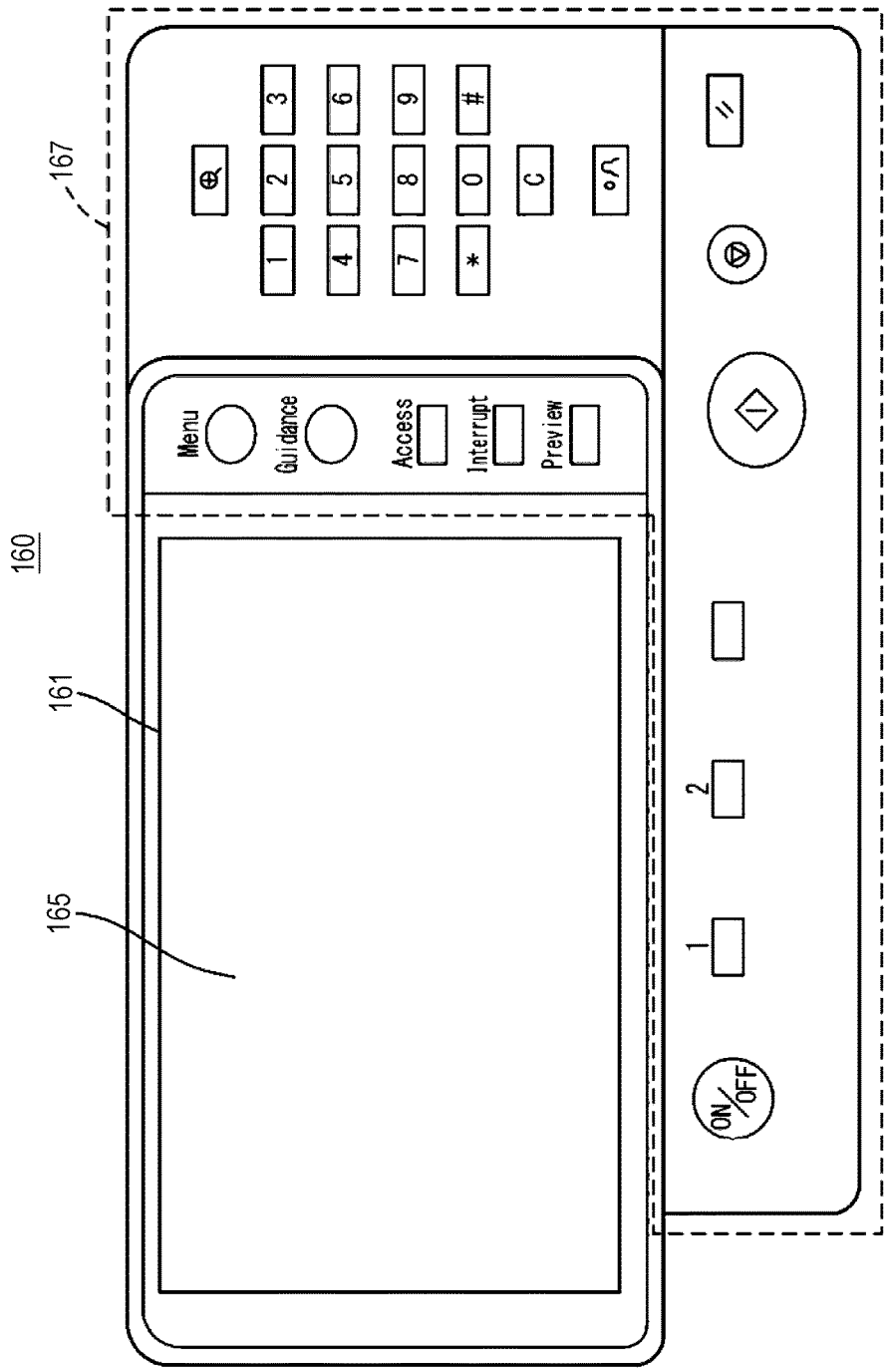
FIG. 4 is a plan view showing an example of an operation panel.

The operation panel 160 is provided on a top face of the MFP 100. FIG. 4 is a plan view showing an example of the operation panel. The broken line in FIG. 4 is drawn to indicate a hard key unit 167, which will be described later, but does not actually exist. In FIG. 4, the operation panel 160 includes a display unit 161 and an operation unit 163. The display unit 161 is a liquid crystal display (LCD), for example, that displays instruction menus for the user, information on acquired image data, etc.

The operation unit 163 includes a touch panel 165 and the hard key unit 167. The touch panel 165 is overlaid on a top face or a bottom face of the display unit 161. The hard key unit 167 includes multiple hard keys. The hard keys are contact switches, for example. The touch panel 165 detects a position indicated by the user on a display surface of the display unit 161. Since the user is likely to stand upright when operating the MFP 100, the display surface of the display unit 161, an operation surface of the touch panel 165, and the hard key unit 167 are arranged in a face-up state. This allows the user to visually recognize the display surface of the display unit 161 easily and to give instructions the operation unit 163 easily with a finger.

Figure 5:
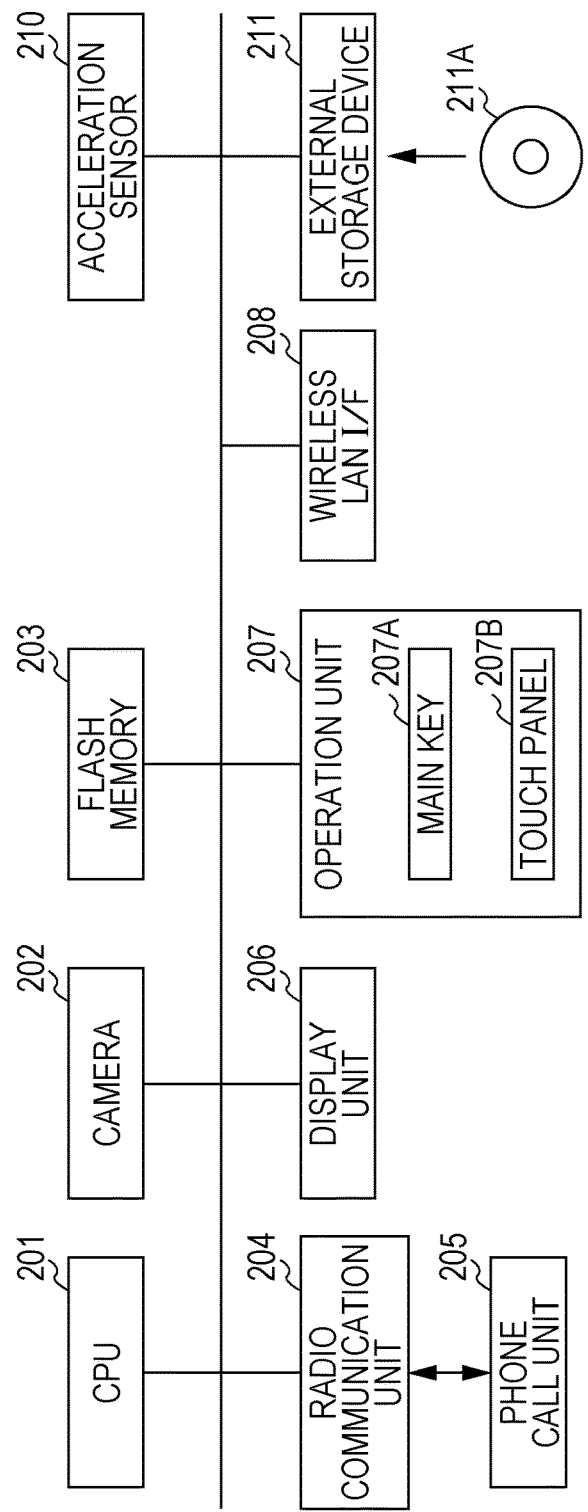
FIG. 5 is a block diagram showing an outline of a hardware configuration of a portable information device.

FIG. 5 is a block diagram showing an outline of a hardware configuration of the portable information device. In FIG. 5, the portable information device 200 according to the present embodiment includes a CPU 201 for controlling the entire portable information device 200, a camera 202, flash memory 203 configured to store data in a nonvolatile manner, a radio communication unit 204 connected to a phone call unit 205, a display unit 206 configured to display information, an operation unit 207 configured to received user's operations, a wireless LAN I/F 208, an acceleration sensor 210, and an external storage device 211.

The display unit 206 is a display device such as a liquid crystal display (LCD) or an organic ELD that displays instruction menus for the user, information on acquired image data, etc. The operation unit 207 includes a main key 207A and a touch panel 207B. When the user gives an instruction to the display surface of the display unit 206, the operation unit 207 outputs a position on the display surface detected by the touch panel 207B to the CPU 201. The CPU 201 detects the position indicated by the user in a screen displayed on the display unit 206 on the basis of the position detected by the touch panel 207B. The CPU 201 receives input of various instructions, data such as characters and numbers resulting from user's operations on the basis of the screen displayed on the display unit 206 and the position detected by the touch panel 207B. For example, when a screen containing an image of a numeric keypad is displayed on the display unit 206, a number associated with a key displayed at the position detected by the touch panel 207B is received.

The camera 202 includes a lens and a photoelectric transducer, and is configured to focus light collected by the lens on the photoelectric transducer, which carries out photoelectric conversion on the received light and outputs image data to the CPU 201. The photoelectric transducer is a CMOS (complementary metal oxide semiconductor) sensor, a CCD (charge coupled device) sensor, or the like.

The radio communication unit 204 carries out radio communication with a base station for mobile phones that is connected to a telephone communication network. The radio communication unit 204 connects the portable information device 200 to the telephone communication network to enable a phone call using the phone call unit 205. The radio communication unit 204 decodes a speech signal obtained by demodulating a radio signal received from the base station for mobile phones, and outputs the decoded speech signal to the phone call unit 205. The radio communication unit 204 also encodes speech input from the phone call unit 205 and transmits the encoded speech to the base station for mobile phones. The phone call unit 205 includes a microphone and a speaker, and is configured to output speech input from the radio communication unit 204 through the speaker and output speech input from the microphone to the radio communication unit 204. Furthermore, the radio communication unit 204 is controlled by the CPU 201, connects the portable information device 200 to an electronic mail server, and transmits/receives electronic mails.

The wireless LAN I/F 208 is an interface for communicating with the radio station 5 to connect the portable information device 200 to the network 3. The portable information device 200 registers IP (Internet protocol) addresses of the PC 300 and the MFP 100, which allows the portable information device 200 to communicate with and transmit/receive data to/from the PC 300 and the MFP 100. Although an example in which the portable information device 200 communicates with the PC 300 and the MFP 100 by using the wireless LAN I/F 208 is described in the present embodiment, the communication may be made in other manners. Specifically, when the portable information device 200, the PC 300, and the MFP 100 has near field communication devices such as Bluetooth (registered trademark) mounted thereon, the portable information device 200 may communicate one-to-one with either of the PC 300 and the MFP 100.

The flash memory 203 stores programs to be executed by the CPU 201 and data necessary for executing the programs. The CPU 201 loads programs recorded on the flash memory 203 into a RAM included in the CPU 201 and executes the programs.

The acceleration sensor 210 is a three-axis acceleration sensor configured to measure accelerations in three directions along an X axis, a Y axis, and a Z axis. The acceleration sensor 210 outputs the detected accelerations to the CPU 201.

The external storage device 211 is removable from the portable information device 200, and a CD-ROM. 210A storing remote operation programs can be mounted thereon. The CPU 201 can access the CD-ROM 210A via the external storage device 211. The CPU 201 loads the remote operation programs recorded on the CD-ROM 210A mounted on the external storage device 211 into the RAM included in the CPU 201 and executes the programs.

Although the programs recorded on the flash memory 203 or the CD-ROM 210A are mentioned as the programs to be executed by the CPU 201, the programs may include a program obtained by rewriting a program stored in the flash memory 203 or additionally written into the flash memory 203 by another computer connected to the network 3. Furthermore, the programs may include a program downloaded by the portable information device 200 from another computer connected to the network 3. Programs used herein include not only programs that can be directly executed by the CPU 201 but also source programs, compressed programs, encrypted programs, and the like.

The medium storing the programs to be executed by the CPU 201 is not limited to the CD-ROM 211A, but may be an optical disc (MO, MD, DVD), an IC card, an optical card, and a semiconductor memory such as a mask ROM, an EPROM, and an EEPROM.

Figure 6:
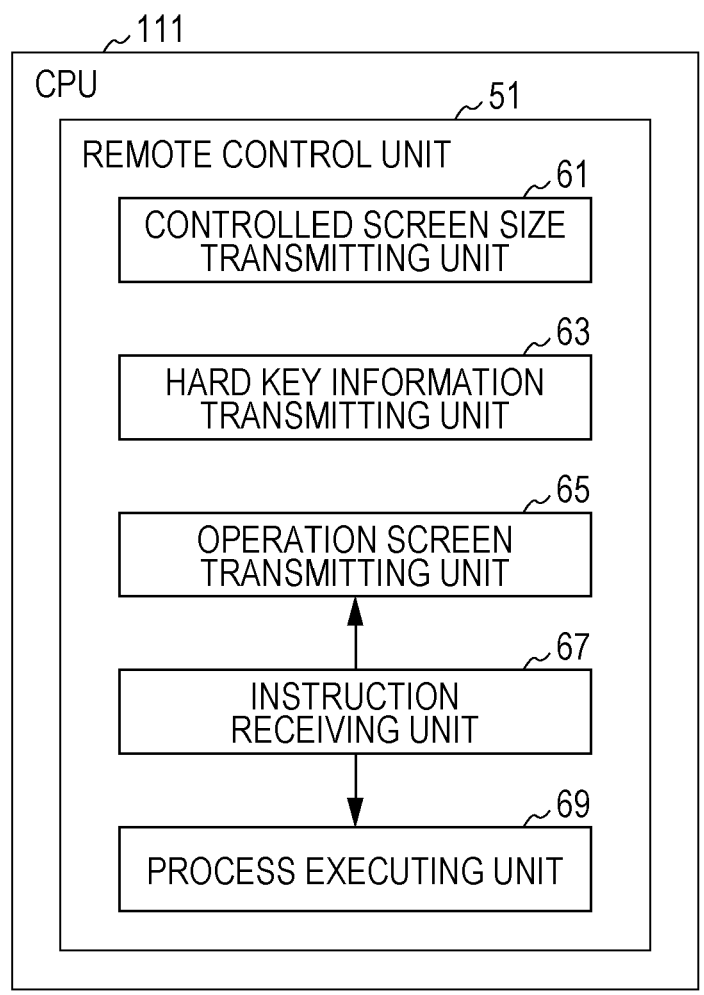
FIG. 6 is a block diagram showing an example of functions of a CPU included in the MFP according to a first embodiment.

FIG. 6 is a block diagram showing an example of functions of the CPU included in the MFP according to the first embodiment. The functions shown in FIG. 6 are functions formed in the CPU 111 included in the MFP 100 as a result of executing the remote control programs stored in the ROM 113, the HDD 115, and the CD-ROM 118 by the CPU 111. In FIG. 6, the CPU 111 includes a remote control unit 51. The remote control unit 51 executes processes according to remote operations received from a remote operation device. The remote control unit 51 controls the communication I/F unit 112 to receive a connection request from the remote operation device and establishes a communication path for communication with the remote operation device. Herein, an example in which a connection request is received from the portable information device 200 that is a remote operation device will be described. In this case, the remote control unit 51 establishes a communication path for communication with the portable information device 200, transmits an operation screen to the portable information device 200 in response to the request from the portable information device 200, and executes a process according to a remote operation received from the portable information device 200.

The remote control unit 51 includes a controlled screen size transmitting unit 61, a hard key information transmitting unit 63, an operation screen transmitting unit 65, an instruction receiving unit 67, a process executing unit 69. When the communication path for communication with the portable information device 200 that is a remote operation device is established, the controlled screen size transmitting unit 61 transmits a controlled screen size to the portable information device 200 via the communication I/F unit 112. The controlled screen size is the size of the display surface of the display unit 161. Since the display unit 161 displays an operation screen over the entire display surface, the controlled screen size is the same as the size of the operation screen. Herein, the controlled screen size is expressed by the number of vertical pixels and the number of horizontal pixels of the display unit 161.

When the communication path for communication with the portable information device 200 that is a remote operation device is established, the hard key information transmitting unit 63 transmits hard key information to the portable information device 200 via the communication I/F unit 112. The hard key information is information associated with each of multiple hard keys included in the hard key unit 167. The hard key information contains key identification information for identifying each hard key, group identification information for identifying a group to which the hard key belongs, and an array direction. The group identification information is information identifying a group containing one or more hard keys. The array direction is associated with a group and defines the direction in which multiple hard keys included in the group are arranged. The direction is defined in association with an operation screen, and includes an horizontal direction parallel to the horizontal direction of the operation screen and a vertical direction parallel to the vertical direction of the operation screen.

Some of the hard keys included in the hard key unit 167 are classified into one of the groups. The groups are preset for classifying the hard keys by function. Examples of the functions include a shortcut function to which a command for switching to a predetermined operation screen is assigned, a job control function to which a command for controlling a job executed by the MFP 100 is assigned, an interrupt processing function for executing another process while the user is operating the MFP 100, and an input processing function for inputting a set value.

The hard key information may define multiple subgroups into which a group is further divided. The hard key information contains subgroup identification information for identifying each of the subgroups in association with the group identification information, a sub-array direction, and a priority of each of the pieces of subgroup identification information. The sub-array direction is associated with a group and defines the direction in which multiple subgroups are arranged. The arrangement direction is defined in association with an operation screen, and includes an horizontal direction parallel to the horizontal direction of the operation screen and a vertical direction parallel to the vertical direction of the operation screen. The hard key information defines, for one or more hard keys included in a group, one or more hard keys included in each of multiple subgroups.

Figure 7:
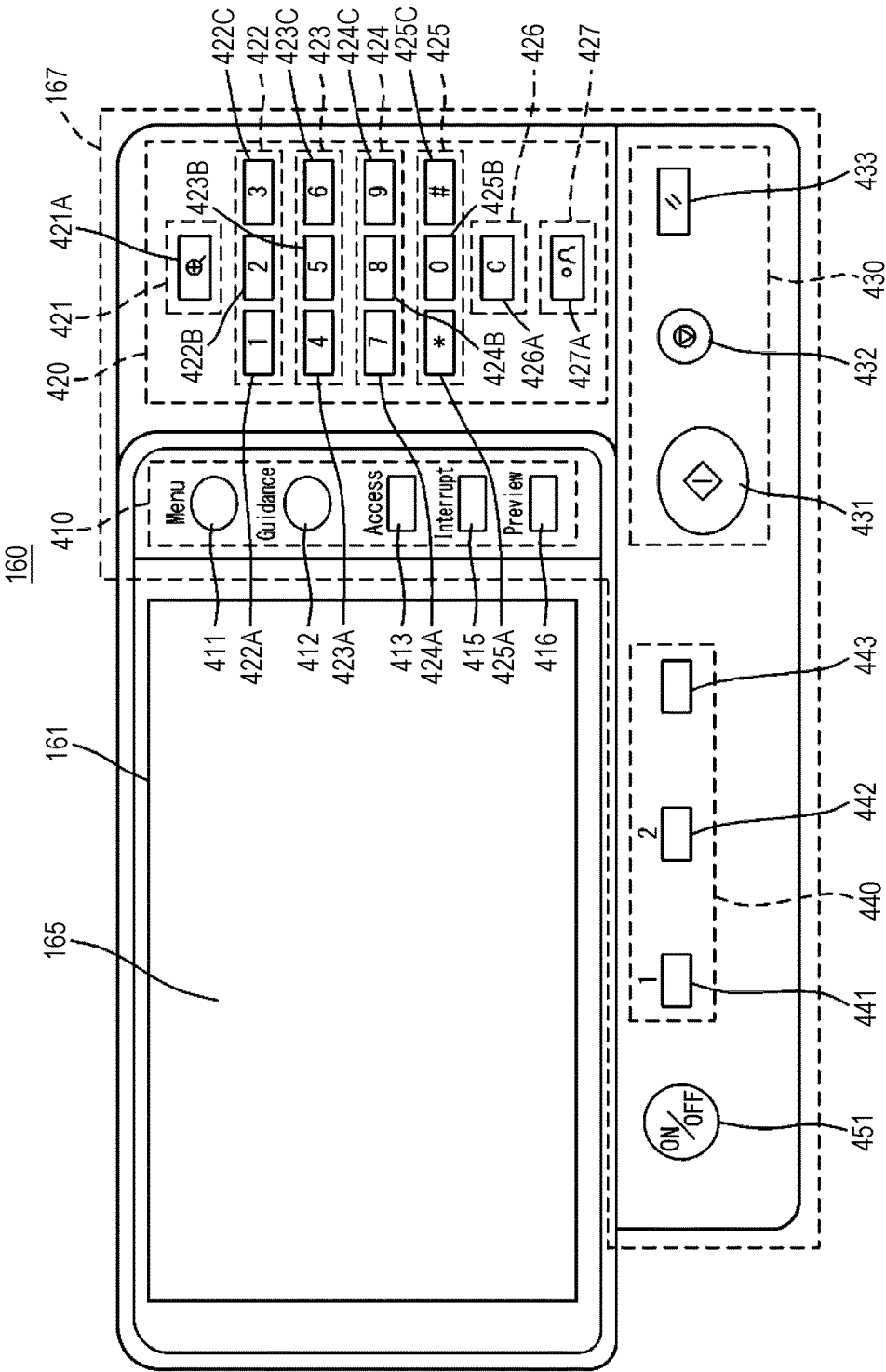
FIG. 7 is a diagram showing an example of the relation between multiple hard keys included in a hard key unit and hard key information.

FIG. 7 is a diagram showing an example of the relation between multiple hard keys included in the hard key unit and hard key information. In FIG. 7, the hard key unit 167 includes multiple hard keys classified into a first group 410, a second group 420, a third group 430, and a fourth group 440, and a hard key 451 for switching between power on and off. The broken lines in FIG. 7 are drawn to indicate the first to fourth groups, but do not actually exist.

Six hard keys 411 to 416 having interrupt processing functions for executing another process while the user is operating the MFP 100 are classified into the first group 410. Multiple hard keys having input processing functions for inputting a set value are classified into the second group 420, and the second group 420 includes first to seventh subgroups 421 to 427. The first subgroup 421 includes one hard key 421A. The second subgroup 422 includes three hard keys 422A to 422C. The third subgroup 423 includes three hard keys 423A to 423C. The fourth subgroup 424 includes three hard keys 424A to 424C. The fifth subgroup 425 includes three hard keys 425A to 425C. The sixth subgroup 426 includes one hard key 426A. The seventh subgroup 427 includes one hard key 427A.

Three hard keys 431 to 433 having job control functions to which commands for controlling jobs executed by the MFP 100 are assigned are classified into the third group 430. Three hard keys 441 to 443 having shortcut functions to which commands for switching to predetermined operation screens are assigned are classified into the fourth group 440.

FIG. 8 is a table showing an example of the hard key information. The hard key information shown in FIG. 8 is associated with multiple hard keys included in the hard key unit 167 shown in FIG. 7. In FIG. 8, hard key information 460 contains 11 hard key records. The hard key records include entries of main groups, entries of subgroups, entries of keys, entries of array directions, entries of priorities, entries of sub-priorities, and entries of sub-array directions. In each entry of a main group, group identification information for identifying a group is set. Herein, an example in which group identification information data of first to fourth groups are set is presented. In each entry of a subgroup, subgroup identification information for identifying a subgroup is set. Herein, since only the second group includes first to seventh subgroups, an example in which subgroup identification information data for these subgroups is presented. In each entry of a key, key identification information for identifying a hard key is set. Herein, reference numerals by which the hard keys are designated shown in FIG. 7 are presented as key identification information data. In each entry of an array direction, an array direction in which hard keys are arranged is set, and the entries of priorities, priorities of the respective first to fourth groups are set. In the entries of sub-priorities, priorities of the respective first to seventh subgroups 421 to 427 included in the second group 420 are set, and in the entry of the sub-array direction, the array direction in which the first to seventh subgroups 421 to 427 are arranged is set.

Referring back to FIG. 6, the operation screen transmitting unit 65 controls the communication I/F unit 112 to transmit an operation screen to the portable information device 200 that is a remote operation device. As a result, the operation screen is displayed by the portable information device 200. There are multiple operation screens, each of which is associated with one or more other operation screens, and the operation screens forms a hierarchical structure. Each operation screen contains a button for inputting an instruction to switch an operation screen to another operation screen so that the user can switch a displayed operation screen to another operation screen, and the button is associated with the operation screen to be switched to. Hereinafter, a button provided in an operation screen and configured to receive an operation to switch to another operation screen associated with the operation screen will be referred to as a transition button.

The instruction receiving unit 67 controls the communication I/F unit 112 to receive a remote instruction transmitted from the portable information device 200 that is a remote operation device. A remote instruction may contain position information indicating a position in an operation screen or may contain key identification information of a hard key. When a remote instruction containing position information is received, the instruction receiving unit 67 locates the position in the remote operation screen transmitted by the operation screen transmitting unit 65 immediately before the remote instruction, and specifies a remote operation from the located position. Remote operations include a setting operation for setting a set value, a screen transition operation for changing a set screen, and an execution instruction operation for instructing execution of a process. If the position located in the operation screen transmitted by the operation screen transmitting unit 65 on the basis of the position information contained in the remote instruction is within a transition button, a screen transition operation is specified. If the position located in the operation screen transmitted by the operation screen transmitting unit 65 on the basis of the position information contained in the remote instruction is within an area to which a command for setting a set value is assigned, a setting operation is specified. If the position located in the operation screen transmitted by the operation screen transmitting unit 65 on the basis of the position information contained in the remote instruction is within an area to which an execution command is assigned, an execution instruction operation is specified. In contrast, when a remote instruction containing key identification information is received, the instruction receiving unit 67 specifies a remote operation associated with a hard key identified by the key identification information.

When a setting operation is specified on the basis of a remote operation, the instruction receiving unit 67 outputs a setting command instructing to set a set value specified by the setting operation to the process executing unit 69. When an execution instruction operation is specified on the basis of a remote operation, the instruction receiving unit 67 outputs an execution command instructing to execute a process specified by the execution instruction operation to the process executing unit 69. When a screen transition operation is specified on the basis of a remote operation, the instruction receiving unit 67 outputs screen identification information for identifying an operation screen specified by the screen transition operation to the operation screen transmitting unit 65.

The process executing unit 69 changes a set value in response to input of a setting command from the instruction receiving unit 67. The process executing unit 69 executes a process specified by an execution command according to a set value in response to input of the execution command from the instruction receiving unit 67. Processes executed by the process executing unit 69 include a scanning process of controlling the automatic original conveyor 120 and the original reading unit 130 to read the original image, an image forming process of controlling the image forming unit 140, the paper feeding unit 150, and the post-processing unit 155 to form an image on paper, a data management process of reading data stored in the HDD 115 or the CD-ROM 118 or writing data therein, a facsimile process of controlling the facsimile unit 116 to transmit/receive facsimile data, and a data transmission/reception process of controlling the communication I/F unit 112 to transmit/receive data. Processes executed by the process executing unit 93 include processes combining two or more of the processes stated above. For example, the processes include a copy process combining the scanning process and the image forming process, a scan-to transmission process combining the scanning process and the data transmission process for transmitting image data obtained by reading an original image, and a scan-to-box process combining the scanning process and the data management process for storing image data obtained by reading an original image in the HDD 115.

Figure 9:
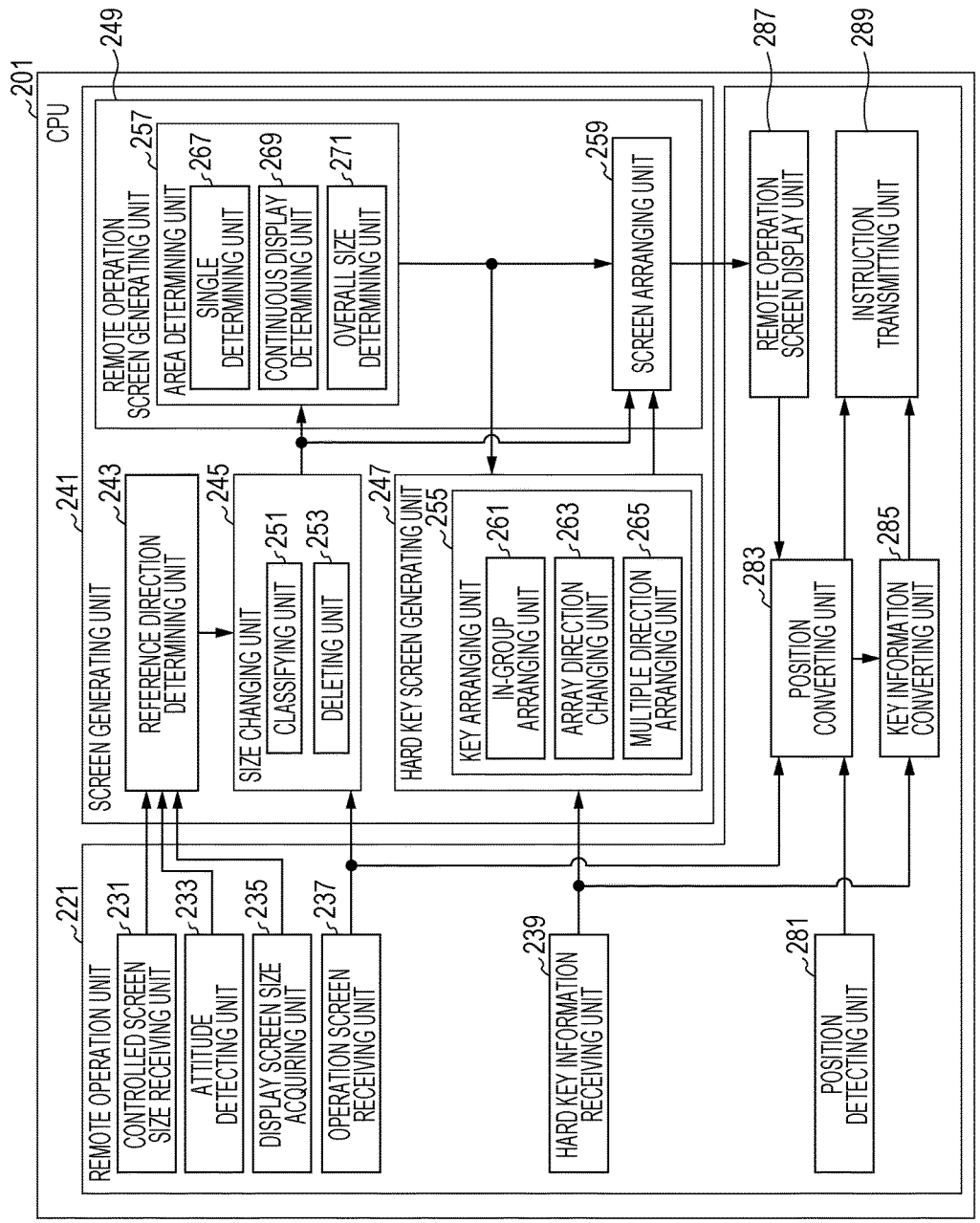
FIG. 9 is a block diagram showing an example of an outline of functions of a CPU included in a portable information device according to the first embodiment.

FIG. 9 is a block diagram showing an example of an outline of functions of the CPU included in the portable information device according to the first embodiment. The functions shown in FIG. 9 are functions formed in the CPU 201 included in the portable information device 200 as a result of executing the remote control programs stored in the flash memory 203 and the CD-ROM 211A by the CPU 201. The remote operation programs include a screen generation program. In FIG. 9, the CPU 201 includes a remote operation unit 221 configured to remotely control the MFP 100 and a screen generating unit 241.

When the user operates the operation unit 207 to input an instruction to remotely operate the MFP 100, the remote operation unit 221 controls the wireless LAN I/F 208 to transmit a connection request to the MFP 100 and establish a communication path for communication with the MFP 100. The remote operation unit 221 includes a controlled screen size receiving unit 231, an attitude detecting unit 233, a display screen size acquiring unit 235, an operation screen receiving unit 237, a hard key information receiving unit 239, a position detecting unit 281, a position converting unit 283, a key information converting unit 285, a remote operation screen display unit 287, and an instruction transmitting unit 289.

When the communication path for communication with the MFP 100 is established, the controlled screen size receiving unit 231 controls the wireless LAN I/F 208 to receive a controlled screen size from the MFP 100 and outputs the received controlled screen size to the screen generating unit 241.

The attitude detecting unit 233 detects the attitude of the portable information device 200 on the basis of accelerations along three axes output by the acceleration sensor 210, and outputs the detected attitude of the portable information device 200 to the screen generating unit 241. Herein, the attitude of the portable information device 200 is expressed by directions of the display unit 206 with respect to the direction of gravitational force. Since the shape of the display surface of the display unit 206 is a rectangle, the attitude of the portable information device 200 is either in a vertical direction in which the long side direction of the display unit 206 is closer to the direction of gravitational force than the short side direction thereof and a horizontal direction in which the short side direction of the display unit 206 is closer to the direction of gravitational force than the long side direction thereof. The attitude detecting unit 233 detects an attitude in which the display surface of the display unit 206 is horizontally long when the angle between the short side direction of the display surface of the display unit 206 and the direction of gravitational force is smaller, or detects an attitude in which the display surface of the display unit 206 is vertically long when the angle between the long side direction thereof and the direction of gravitational force is smaller.

The display screen size acquiring unit 235 detects a display screen size and outputs the display screen size to the screen generating unit 241. The display screen size is the size of the display surface of the display unit 206. Hereinafter, the display surface of the display unit 206 will be referred to as the display screen. Since the display screen has a rectangular shape, the display screen size is expressed by the number of pixels in the long side direction of the display screen and the number of pixels in the short side direction thereof.

When the communication path for communication with the MFP 100 is established, the operation screen receiving unit 237 controls the wireless LAN I/F 208 to receive an operation screen from the MFP 100 and outputs the received operation screen to the screen generating unit 241.

When the communication path for communication with the MFP 100 is established, the hard key information receiving unit 239 controls the wireless LAN I/F 208 to receive hard key information from the MFP 100 and outputs the received hard key information to the screen generating unit 241.

The screen generating unit 241 includes a reference direction determining unit 243, a size changing unit 245, a hard key screen generating unit 247, and a remote operation screen generating unit 249. The reference direction determining unit 243 receives as input the controlled screen size from the controlled screen size receiving unit 231, the attitude of the portable information device 200 from the attitude detecting unit 233, and the display screen size from the display screen size acquiring unit 235. The reference direction determining unit 243 determines a reference direction on the basis of the controlled screen size, the attitude of the portable information device 200, and the display screen size. The reference direction is a direction with respect to the operation screen that is either the vertical direction or the horizontal direction of the operation screen. Herein, the operation screen has the same size as the display surface of the display unit 161 of the MFP 100 that has a shape of a horizontally long rectangle. In this case, the direction parallel to the shorter sides out of the four sides surrounding the operation screen is the vertical direction, and the direction parallel to the longer sides is the horizontal direction.

The reference direction determining unit 243 may determine the reference direction or may not determine the reference direction. When the reference direction is to be determined, the reference direction determining unit 243 outputs the reference direction to the size changing unit 245. When the reference direction is not to be determined, the reference direction determining unit 243 outputs a signal indicating that the reference direction is not to be determined to the size changing unit 245.

The reference direction determining unit 243 determines the reference direction to be the horizontal direction when the shape of the display screen (the display surface of the display unit 206) is vertically longer than that of the operation screen, determines the reference direction to be the vertical direction when the shape of the display screen is horizontally longer than that of the operation screen, or does not determine the reference direction when the shape of the display screen is substantially the same as that of the operation screen.

The shape of the display screen (the display surface of the display unit 206) is determined according to the attitude of the portable information device 200. For example, when the aspect ratio of the display screen is represented by R1=(the vertical length of the display screen)/(the horizontal length of the display screen), and if an attitude in which the display screen is vertically long is detected as the attitude of the portable information device 200, the shape of the display screen is vertically long and the aspect ratio R1 is larger than 1. If an attitude in which the display screen is horizontally long is detected as the attitude of the portable information device 200, the shape of the display screen is horizontally long and the aspect ratio R1 is smaller than 1. If the display screen has a square shape, the aspect ratio R1 is 1 independently of the attitude of the portable information device 200.

When the aspect ratio of the operation screen is represented by R2=(the vertical length of the operation screen)/(the horizontal length of the operation screen), the aspect ratio R2 is larger than 1 if the operation screen is vertically long and the aspect ratio R2 is smaller than 1 if the operation screen is horizontally long. The aspect ratio R2 is 1 if the operation screen has a square shape.

The reference direction determining unit 243 determines the reference direction to be the horizontal direction if a value obtained by dividing the aspect ratio R1 of the display surface of the display unit 206 by the aspect ratio R2 of the operation screen is equal to or larger than a threshold T1, determines the reference direction to be the vertical direction if the value is equal to or smaller than a threshold T2, and does not determine the reference direction if the value is larger than the threshold T2 and smaller than the threshold T1.

The size changing unit 245 receives as input the operation screen from the operation screen receiving unit 237 and the reference direction from the reference direction determining unit 243. The size changing unit 245 generates a size-changed screen resulting from changing the size of the operation screen, and outputs the generated size-changed screen to the remote operation screen generating unit 249. The size changing unit 245 generates the size-changed screen by changing the size in a dependent direction that is the direction other than the reference direction of the vertical direction and the horizontal direction of the operation screen. If the reference direction is the vertical direction, the dependent direction is the horizontal direction, and the size changing unit 245 generates a size-changed screen resulting from changing the size in the horizontal direction of the operation screen. If the reference direction is the horizontal direction, the dependent direction is the vertical direction, and the size changing unit 245 generates a size-changed screen resulting from changing the size in the vertical direction of the operation screen.

The size changing unit 245 includes a classifying unit 251. The classifying unit 251 classifies multiple components contained in the operation screen into groups, and outputs component information to a deleting unit 253. The component information is information for specifying a group into which each component is classified. When the operation screen is a web page written in a markup language and received from the MFP 100, the classifying unit 251 analyzes the web page to classify related components into the same group. For example, when an item name and an entry field of a set value are included as components, the item name and the entry field of the set value associated with the item are classified into the same group. Furthermore, multiple item names arranged in the same column or in the same row are classified into the same group.

When an operation screen is received as image data from the MFP 100, the classifying unit 251 analyzes the image data to extract components therefrom. For example, a rectangular area containing a series of characters is extracted as one component. Furthermore, an area enclosed by a line is extracted as one component. The classifying unit classifies multiple components into one or more groups depending on positions at which the components are arranged in the operation screen. For example, multiple components at the same vertical position are classified into the same group, and multiple components at the same horizontal position are classified into the same group. Since the components are extracted as rectangle areas in the operation screen, whether or not the vertical positions or the horizontal positions are the same is determined on the basis of coordinates of upper-left corners of the components.

The deleting unit 253 receives as input the component information from the classifying unit 251, and deletes at least part of both spaces adjacent to each of two or more components arranged in the dependent direction in the operation screen. The amount of spaces to be deleted is a predetermined proportion. For example, if the proportion of deletion is 80%, the spaces are reduced to a size of 20%. Note that the deleting unit 253 arranges the two or more components belonging to the same group and arranged in the reference direction all at the same position in the dependent direction. In this manner, multiple components contained in an operation screen can be arranged in the same relation in a size-changed screen as the relation in which the components are arranged in the operation screen.

The remote operation screen generating unit 249 receives as input the size-changed screen from the size changing unit 245 and a hard key screen from the hard key screen generating unit 247, which will be described later, generates a remote operation screen containing the size-changed screen and the hard key screen, and outputs the generated remote operation screen to the remote operation screen display unit 287.

The remote operation screen generating unit 249 includes an area determining unit 257 and a screen arranging unit 259. The area determining unit 257 determines areas in the remote operation screen in which the size-changed screen and the hard key screen are to be arranged. The area determining unit 257 determines a first area for arranging the size-changed screen in the remote operation screen and determines the remaining area as a second for arranging the hard key screen. The area determining unit 257 outputs the second area to the hard key screen generating unit 247, and outputs the first area and the second area to the screen arranging unit 259.

The area determining unit 257 includes a single determining unit 267, a continuous display determining unit 269, and an overall size determining unit 271. The area determining unit 257 activates one of the single determining unit 267, the continuous display determining unit 269, and the overall size determining unit 271 according to an area determination mode. The area determination mode is preset by the user to one of a single mode, a continuous display mode, and a full mode. The area determining unit 257 activates the single determining unit 267 if the area determination mode is set to the single mode, activates the continuous display determining unit 269 if the area determination mode is set to the continuous display mode, and activates the overall size determining unit 271 if the area determination mode is set to the full mode.

The single determining unit 267 determines the first area for each size-changed screen, or in other words, for each operation screen. The first area may vary when the size-changed screen (operation screen) varies. Each time a size-changed screen is input from the size changing unit 245, the single determining unit 267 changes the size of the size-changed screen at different magnifications in different directions so that the size of the size-changed screen in the reference direction becomes the same as that of the remote operation screen in the reference direction, and determines an area of the same size as the resulting size-changed screen to be the first area.

The continuous display determining unit 269 executes the same process of first determining the first area as that of the single determining unit 267. When a second size-changed screen is input in a state in which the first area is determined on the basis of a first size-changed screen input prior to the second size-changed screen, and if the size of the first size-changed screen in the dependent direction is equal to or larger than the size of the second size-changed screen in the dependent direction, the continuous display determining unit 269 determines the first area determined on the basis of the first size-changed screen as a first area for the second size-changed screen. If the size of the first size-changed screen in the dependent direction is smaller than the size of the second size-changed screen in the dependent direction, the continuous display determining unit 269 changes the size of the second size-changed screen at different magnifications in different directions so that the size of the second size-changed screen in the reference direction becomes the same as that of the remote operation screen in the reference direction, and determines an area of the same size as the resulting second size-changed screen to be the first area.

The overall size determining unit 271 determines a size-changed screen having the largest size in the dependent direction from among multiple size-changed screens associated with all the multiple operations screens, respectively, stored by the MFP 100 to be a reference size-changed screen, changes the size of the reference size-changed screen at different magnifications in different directions so that the size of the reference size-changed screen in the reference direction becomes the same as that of the remote operation screen in the reference direction, and determines an area having the same size as the resulting reference size-changed screen to be the first area.

The hard key screen generating unit 247 receives as input the hard key information from the hard key information receiving unit 239 and the second area from the area determining unit 257. The hard key screen generating unit 247 includes a key arranging unit 255. The key arranging unit 255 generates a hard key screen by arranging one or more soft key images associated with one or more hard keys, respectively, defined by the hard key information in a hard key screen having the same size as the second area, and outputs the generated hard key screen to the screen arranging unit 259 and the position converting unit 283. The hard key information contains key identification information for identifying each hard key, group identification information for identifying a group to which the hard key belongs, and an array direction. The portable information device 200 stores a soft key image associated with each hard key in advance. A soft key image is an image shaped like a hard key. The size of a soft key image is determined in advance. The hard key screen generating unit 247 arranges one or more soft key images associated with one or more hard keys, respectively, included in the same group at narrower intervals than those between soft key images associated with one or more hard keys, respectively, included in different groups and arranged at the closest positions. In this manner, in each of multiple groups, one or more soft key images associated with one or more hard keys, respectively, included in the group can be arranged in a state distinguished from soft key images associated with hard keys included in other groups.

The key arranging unit 255 includes an in-group arranging unit 261, an array direction changing unit 263, and a multiple direction arranging unit 265. The in-group arranging unit 261 arranges one or more soft key images associated with one or more hard keys, respectively, included in the same group in an array direction defined for the group by the hard key information.

In some cases, the in-group arranging unit 261 cannot arrange one or more soft key images. For example, the in-group arranging unit 261 cannot arrange one or more soft key images when the length of a remaining area of the second area in the array direction is shorter than the length an array of the one or more soft key images arranged in the array direction. The remaining area of the second area is an area remaining after one or more soft key images included in another group are arranged. For a group for which one or more soft key images cannot be arranged, the array direction changing unit 263 arranges one or more soft key images associated with one or more hard keys, respectively, included in the group in a direction different from the array direction defined for the group by the in-group arranging unit 261.

In some cases, the array direction changing unit 263 cannot arrange one or more soft key images. For example, the array direction changing unit 263 cannot arrange one or more soft key images when the length in the long side direction of the remaining area of the second area is shorter than the length of an array of one or more soft key images arranged in the long side direction or when the length in the short length direction of the remaining area is shorter the length of an array of one or more soft key images arranged in the short side direction of the second area.

For a group for which one or more soft key images cannot be arranged by the array direction changing unit 263, the multiple direction arranging unit 265 arranges one or more soft key images associated with one or more hard keys, respectively, included in the group in multiple directions regardless of the array direction defined for the group. Specifically, the multiple direction arranging unit 265 arranges as many soft key images as possible of one or more soft key images associated with one or more hard keys, respectively, included in a group in the array direction defined for the group in the second area, and arranges the remaining one or more soft keys in the array direction in an area located along a different direction from the array direction of the arranged one or more soft key images.

In some cases, the hard key information may define multiple subgroups into which a group is further divided. In this case, the hard key information contains subgroup identification information for identifying each of the subgroups in association with the group identification information, a sub-array direction in which the subgroups are arranged, and a priority of each of the pieces of subgroup identification information. The hard key information defines, for one or more hard keys included in the group, one or more hard keys included in each of multiple subgroups.

The multiple direction arranging unit 265 arranges one or more soft key images associated with one or more hard keys, respectively, included in a subgroup with the highest priority of the multiple subgroups in the array direction in the remaining area of the second area. Subsequently, a remaining area may be present or may not be present along the sub-array direction with respect to the one or more soft key images arranged in the second area. If the remaining area is present, the multiple direction arranging unit 265 arranges one or more soft key images associated with one or more hard keys, respectively, included in a second subgroup with the second highest priority in the array direction in an area located along the sub-array direction with respect to the one or more soft key images arranged in the second area. If the remaining area is not present, the multiple direction arranging unit 265 arranges one or more soft key images associated with one or more hard keys, respectively, included in a second subgroup with the second highest priority in the array direction in an area located along a direction different from the sub-array direction with respect to the one or more soft key images arranged in the second area.

For example, an example in which a hard key screen is generated by using the hard key information 460 shown in FIG. 8 for the second group 420 shown in FIG. 7 will be described. The second group 420 includes first to seventh subgroups 421 to 427.

If a sufficient remaining area is present in the second area, three soft key images 422A to 422C associated with three hard keys in the second subgroup 422 with the highest priority are arranged in the horizontal direction that is the array direction, three soft key images 423A to 423C associated with three hard keys in the third subgroup 423 with the second highest priority are arranged in the horizontal direction that is the array direction in an area thereunder along the sub-array direction that is the vertical direction in this case, three soft key images 424A to 424C associated with three hard keys in the fourth subgroup 424 with the third highest priority are arranged in the horizontal direction that is the array direction in an area thereunder along the sub-array direction, three soft key images 425A to 425C associated with three hard keys in the fifth subgroup 425 with the fourth highest priority are arranged in the horizontal direction that is the array direction in an area thereunder along the sub-array direction, a soft key image 421A associated with a hard key in the first subgroup 421 with the fifth highest priority is arranged in an area thereunder along the sub-array direction, a soft key image 426A associated with a hard key in the sixth subgroup 426 with the sixth highest priority in an area thereunder along the sub-array direction, and a soft key image 427A associated with a hard key in the seventh subgroup 427 with the seventh highest priority is arranged in an area thereunder along the sub-array direction.

The screen arranging unit 259 receives as input the first area and the second area from the area determining unit 257, the size-changed screen from the size changing unit 245, and the hard key screen from the hard key screen generating unit 247. The screen arranging unit 259 generates a remote operation screen by arranging the size-changed screen in the first area of the remote operation screen and arranging the hard key screen in the second area thereof, and outputs the generated remote operation screen, the first area, and the second area to the remote operation screen display unit 287. If the size-changed screen and the first area are different in size, the screen arranging unit 259 changes the size of the size-changed screen at different magnifications in different directions so that the size of the size-changed screen in the reference direction becomes the same as that of the remote operation screen in the reference direction, and arranges an area of the same size as the resulting size-changed screen in the first area.

Alternatively, instead of changing the size or (enlarging or reducing) the size-changed screen at different magnifications in different directions, at least part of both spaces adjacent to each of two or more components arranged in the reference direction in the operation screen may be deleted or added. The amount by which spaces are deleted or added is obtained from the difference between the size of the size-changed screen in the reference direction and the size of the remote operation screen in the reference direction. When a space is deleted, two or more components belonging to the same group and arranged in the dependent direction are arranged all at the same position in the reference direction. In this manner, multiple components contained in an operation screen can be arranged in the same relation in a size-changed screen as the relation in which the components are arranged in the operation screen.

The remote operation screen display unit 287 displays the remote operation screen input from the remote operation screen generating unit 249 on the display unit 206, and outputs the remote operation screen, the first area, and the second area to the position converting unit 283.

The position detecting unit 281 controls the touch panel 207B, and when the touch panel 207B detects a position indicated by the user, locates a position on the display surface of the display unit 206 on the basis of the detected position and outputs position information indicating the located position to the position converting unit 283.

The position converting unit 283 receives as input the remote operation screen, the first area, and the second area from the remote operation screen display unit 287, the operation screen from the operation screen receiving unit 237, and the position information from the position detecting unit 281. The first area of the remote operation screen contains the size-changed screen corresponding to the operation screen.

The position converting unit 283 locates a position in the remote operation screen on the basis of the position information. If the located position is in the first area of the remote operation screen, the position converting unit 283 locates a position in the size-changed screen, and converts the located position into a position in the operation screen. The position converting unit 283 converts the position to a position in the same component in the operation screen as the component present at the position located in the size-changed screen. The position converting unit 283 outputs position information indicating the position in the operation screen resulting from the conversion to the instruction transmitting unit 289.

If the position in the remote operation screen located on the basis of the position information is in the second area of the remote operation screen, the position converting unit 283 outputs the hard key screen and the position information indicating the position in the second area to the key information converting unit 285.

The key information converting unit 285 receives as input the hard key information from the hard key information receiving unit 239 and the hard key screen and the position information indicating the position in the second area from the position converting unit 283. The key information converting unit 285 specifies a soft key image arranged at the position located by the position information indicating the position in the second area among one or more soft key images contained in the hard key screen. The key information converting unit 285 specifies key identification information associated with the specified soft key image, and outputs the specified key identification information to the instruction transmitting unit 289.

The instruction transmitting unit 289 may receive as input the position information from the position converting unit 283 or may receive as input the key identification information from the key information converting unit 285. When the position information is input, the instruction transmitting unit 289 transmits a remote instruction containing the position information to the MFP 100 via the wireless LAN I/F 208. When the key identification information is input, the instruction transmitting unit 289 transmits a remote instruction containing the key identification information to the MFP 100 via the wireless LAN I/F 208.

Although the screen generating unit 241 is assumed to generate remote operation screens each containing a hard key screen for all of the multiple operation screens, the screen generating unit 241 may generate remote operation screens each containing a hard key screen only for predetermined operation screens and generate remote operation screens each containing only the operation screen for the other operation screens. The predetermined operation screens are screens to which operations for indicating a hard key are more likely to be input by the user when the operation screens are displayed than when the other operation screens are displayed. Whether or not to add a hard key screen into an operation screen may be determined on the basis of statistical data. For example, the number of times a hard key is indicated for each of the multiple operation screens is stored, and an operation screen is determined to be an operation screen to which a hard key screen is added if a value obtained by the number of times a hard key is indicated by the number of times the operation screen is displayed is equal to or larger than a predetermined threshold. In this manner, a remote operation screen containing a hard key screen can be displayed on the portable information device 200 when a hard key is likely to be indicated. Furthermore, since a remote operation screen containing only an operation screen without containing a hard key screen is displayed on the portable information device 200 when a hard key is less likely to be indicated, the operation screen can be displayed at as large a size as possible.

Figure 10:
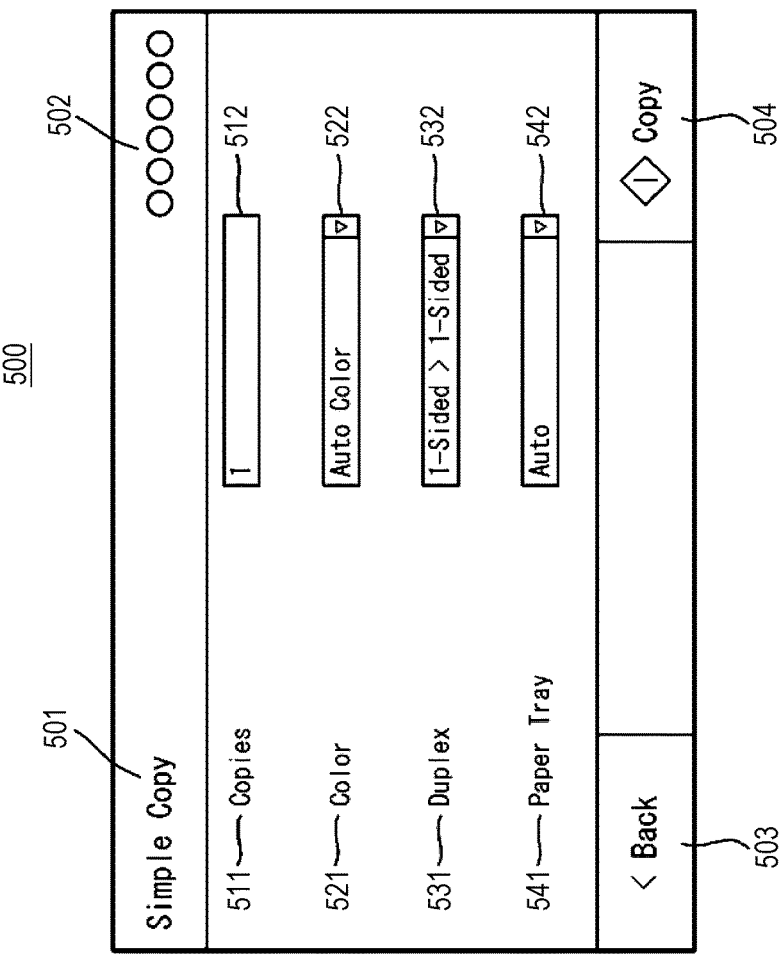
FIG. 10 is a diagram showing an example of an operation screen.

FIG. 10 is a diagram showing an example of an operation screen. In FIG. 10, the operation screen 500 contains components 501, 502, 511, 512, 521, 522, 531, 532, 541, 542, 503, and 504. The components 501 and 502 are in the same group since the vertical positions thereof are the same. Similarly, the components 511 and 512, the components 521 and 522, the components 531 and 532, the components 541 and 542, and the components 503 and 504 are in the same groups.

Furthermore, the components 511, 521, 531 and 541 are in the same group since the horizontal positions thereof are the same. Furthermore, the components 512, 522, 532 and 542 are in the same group since the horizontal positions thereof are the same.

Figure 11:
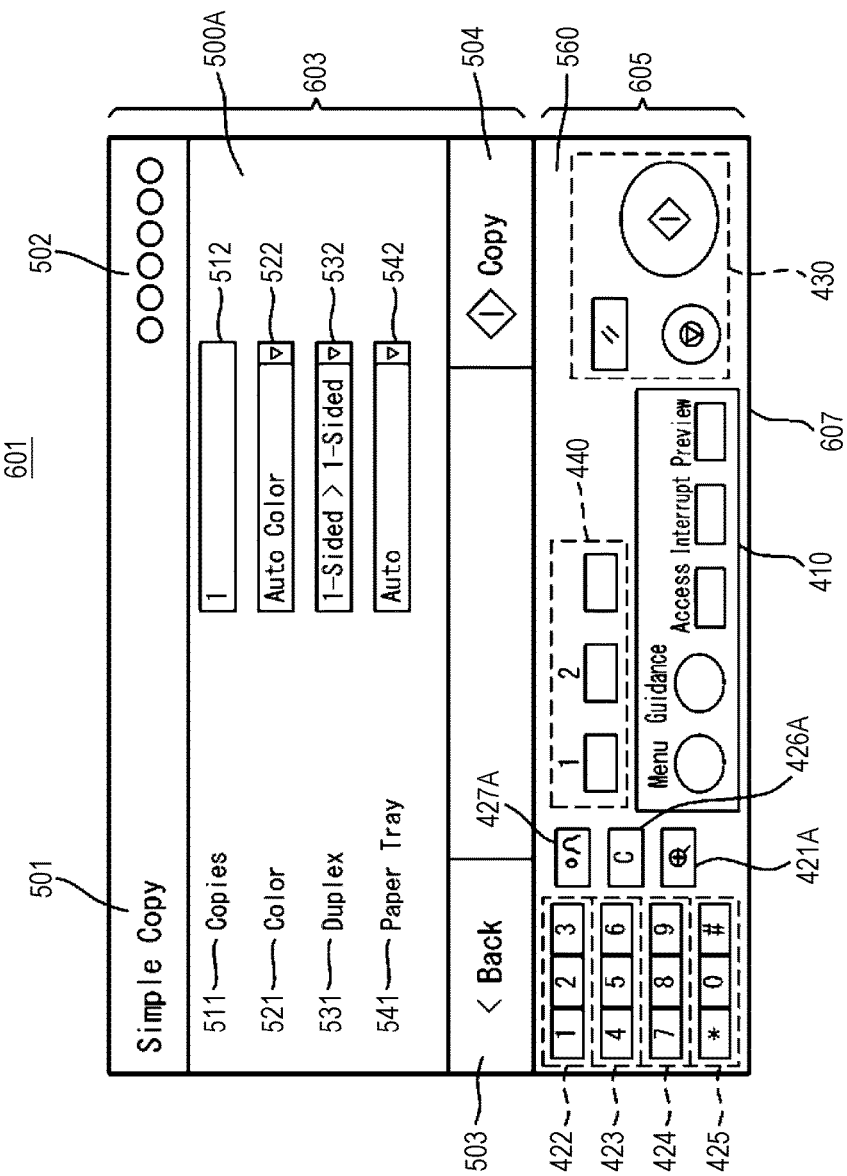
FIG. 11 is a first diagram showing an example of a remote operation screen.

FIG. 11 is a first diagram showing an example of a remote operation screen. The remote operation screen 601 shown in FIG. 11 is a remote operation screen in a case where the ratio P of the aspect ratio of the display surface (controlled screen) of the display unit 206 of the portable information device 200 and the aspect ratio of the operation screen (display screen) is equal to or larger than a threshold TP1, or in other words, in a case where the display surface of the display unit 206 of the portable information device 200 is vertically longer than the display surface of the display unit 161 of the MFP 100. In FIG. 11, the remote operation screen 601 contains a first area 603 and a second area 605. The first area 603 contains a size-changed screen 500A, and the second area 605 contains a hard key screen 607.

The size-changed screen 500A is a screen obtained by reducing spaces between multiple components along the vertical direction in the operation screen shown in FIG. 10 in a predetermined proportion. For example, in the size-changed screen 500A, the space between the component 511 and the component 521 is smaller than that between the component 511 and the component 521 in the operation screen 500. Thus, the size-changed screen 500A has a horizontally longer shape than the operation screen 500.

The hard key screen 607 is a screen in which soft key images associated with multiple hard keys, respectively, are arranged according to the hard key information shown in FIG. 8. Specifically, areas for the first to fourth groups are reserved in the order of priorities, and one or more soft key images associated with one or more hard keys, respectively, contained in the groups are basically arranged in the array direction in the respective areas. More specifically, areas for the first to seventh subgroups 421 to 427 included in the second group 420 with the highest priority are reserved along the sub-array direction in the order of sub-priorities. Specifically, areas for the second subgroup 422, the third subgroup 423, the fourth subgroup 424, and the fifth subgroup 425 in the order of sub-priorities are reserved along the vertical direction that is the sub-array direction. Since there is no area for the first subgroup with the next highest priority present along the sub-array direction, the area is reserved along the horizontal direction different from the sub-array direction. An area for the sixth subgroup with the next highest priority is reserved along the vertical direction that is the sub-array direction, and an area for the seventh subgroup with the lowest priority is similarly reserved along the vertical direction that is the sub-array direction.

Furthermore, in each of the second to fifth subgroups, three soft key images associated with three hard keys, respectively, included in the group are arranged in the horizontal direction that is the array direction.

Since there is no area for arranging five soft key images associated with five hard keys, respectively, included in the first group 410 with the next highest priority in the vertical direction that is the array information, an area in which the five soft key images are arranged in the horizontal direction different from the array direction is reserved. An area for arranging three soft key images associated with three hard keys, respectively, included in the fourth group 440 with the next highest priority in the horizontal direction that is the array direction is reserved, and an area for arranging two of three soft key images associated with three hard keys, respectively, included in the third group 430 with the lowest priority in the horizontal direction that is the array direction and arranging the remaining one soft key image in the vertical direction different from the array direction is reserved.

Figure 12:
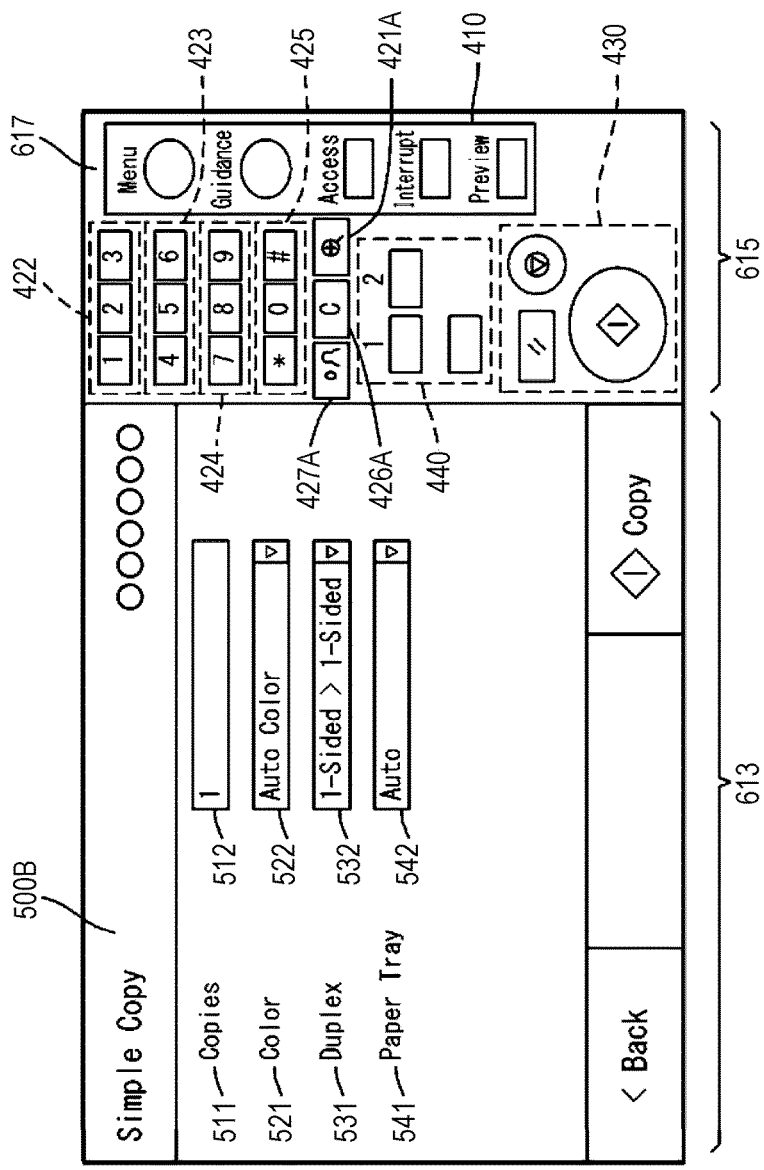
FIG. 12 is a second diagram showing an example of the remote operation screen.

FIG. 12 is a second diagram showing an example of the remote operation screen. The remote operation screen 611 shown in FIG. 12 is a remote operation screen in a case where the ratio P of the aspect ratio of the display surface (controlled screen) of the display unit 206 of the portable information device 200 and the aspect ratio of the operation screen (display screen) is equal to or smaller than a threshold TP2, or in other words, in a case where the display surface of the display unit 206 of the portable information device 200 is horizontally longer than the display surface of the display unit 161 of the MFP 100. In FIG. 12, the remote operation screen 611 contains a first area 613 and a second area 615. The first area 613 contains a size-changed screen 500B, and the second area 615 contains a hard key screen 617.

The size-changed screen 500B is a screen obtained by reducing spaces between multiple components along the horizontal direction in the operation screen shown in FIG. 10 in a predetermined proportion. For example, in the size-changed screen 500B, the space between the component 511 and the component 512 is smaller than that between the component 511 and the component 512 in the operation screen 500. Thus, the size-changed screen 500B has a vertically longer shape than the operation screen 500.

The hard key screen 617 is a screen in which soft key images associated with multiple hard keys, respectively, are arranged according to the hard key information shown in FIG. 8. Specifically, areas for the first to fourth groups are reserved in the order of priorities, and one or more soft key images associated with one or more hard keys, respectively, contained in the groups are basically arranged in the array direction in the respective areas. More specifically, areas for the first to seventh subgroups 421 to 427 included in the second group 420 with the highest priority are reserved along the sub-array direction in the order of sub-priorities. More specifically, areas for the second subgroup 422, the third subgroup 423, the fourth subgroup 424, and the fifth subgroup 425 in the order of sub-priorities are reserved along the vertical direction that is the sub-array direction. Areas for the first subgroup, the sixth subgroup 426, and the seventh subgroup 427 with the next highest priorities are present along the sub-array directions, but are reserved along the horizontal direction different from the sub-array direction so that areas for arranging components of the other groups are reserved.

Furthermore, in each of the second to fifth subgroups, three soft key images associated with three hard keys, respectively, included in the group are arranged in the horizontal direction that is the array direction.

Five soft key images associated with five hard keys, respectively, included in the first group 410 with the next highest priority are arranged in the vertical direction that is the array direction, two of three soft key images associated with three hard keys, respectively, included in the fourth group 440 with the next highest priority are arranged in the horizontal direction that is the array direction, and the remaining one soft key image is arranged in the vertical direction different from the array direction. Two of three soft key images associated with three hard keys, respectively, included in the third group 430 with the lowest priority are arranged in the horizontal direction that is the array information, and the remaining one soft key image is arranged in the vertical direction different from the array direction.

Figure 13:
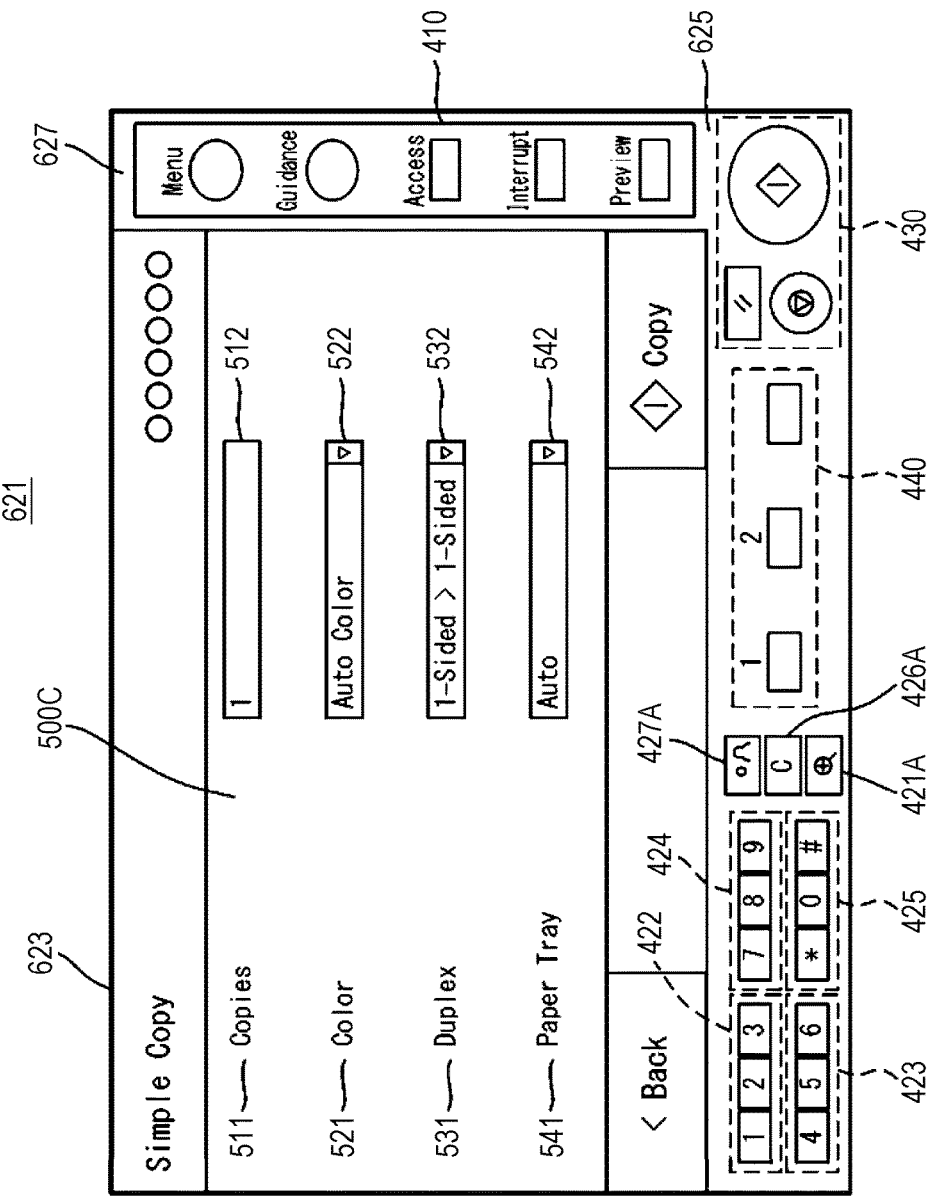
FIG. 13 is a third diagram showing an example of the remote operation screen.

FIG. 13 is a third diagram showing an example of the remote operation screen. The remote operation screen 621 shown in FIG. 13 is a remote operation screen in a case where the ratio P of the aspect ratio of the display surface (controlled screen) of the display unit 206 of the portable information device 200 and the aspect ratio of the operation screen (display screen) is larger than the threshold TP1 and smaller than the threshold TP2, or in other words, in a case where the shape of the display surface of the display unit 206 of the portable information device 200 is substantially the same as that of the display surface of the display unit 161 of the MFP 100. In FIG. 13, the remote operation screen 621 contains a first area 623 and a second area 625. The first area 623 contains a size-changed screen 500C, and the second area 625 contains a hard key screen 627.

The size-changed screen 500C is a screen similar to the operation screen 500 shown in FIG. 10 and obtained by enlarging or reducing the operation screen 500 at a predetermined magnification. The hard key screen 627 is a screen in which soft key images associated with multiple hard keys, respectively, are arranged according to the hard key information shown in FIG. 8. Specifically, among the first to seventh subgroups 421 to 427 included in the second group 420 with the highest priority, areas for the second subgroup 422 and the third subgroup 423 are reserved along the vertical direction that is the sub-array direction in the order of sub-priorities. For the fourth subgroup 424 with the next highest sub-priority, since no area is present thereunder along the vertical direction, an area along the horizontal direction different from the sub-array direction is reserved. An area for the fifth subgroup 425 is then reserved along the vertical direction that is the sub-array direction. For the first subgroup with the next highest sub-priority, since no area is present thereunder along the vertical direction, an area along the horizontal direction different from the sub-array direction is reserved. Areas for the sixth subgroup 426 and the seventh subgroup 427 are then reserved along the vertical direction that is the sub-array direction.

Furthermore, in each of the second to fifth subgroups, three soft key images associated with three hard keys, respectively, included in the group are arranged in the horizontal direction that is the array direction.

Five soft key images associated with five hard keys, respectively, included in the first group 410 with the next highest priority are arranged in the vertical direction that is the array direction, and three soft key images associated with three hard keys, respectively, included in the fourth group 440 with the next highest priority are arranged in the horizontal direction that is the array direction. Three soft key images associated with three hard keys, respectively, included in the third group 430 with the lowest priority are arranged in any direction different from the array information.

Figure 14:
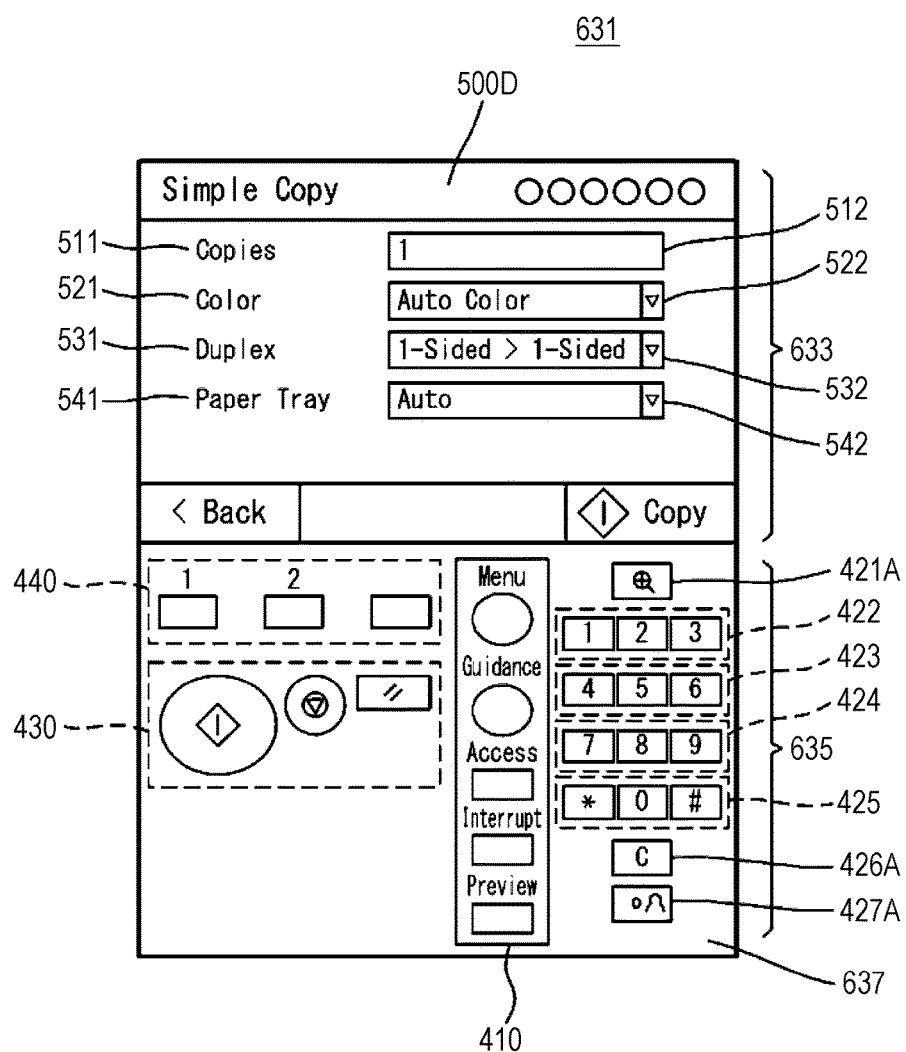
FIG. 14 is a fourth diagram showing an example of the remote operation screen.

FIG. 14 is a fourth diagram showing an example of the remote operation screen. The remote operation screen 631 shown in FIG. 14 is a remote operation screen in a case where the ratio P of the aspect ratio of the display surface (controlled screen) of the display unit 206 of the portable information device 200 and the aspect ratio of the operation screen (display screen) is equal to or smaller than the threshold TP2, or in other words, in a case where the display surface of the display unit 206 of the portable information device 200 is vertically longer than the display surface of the display unit 161 of the MFP 100. In particular, as compared to the example shown in FIG. 11, while the remote screen 601 shown in FIG. 11 is a case in which the portable information device 200 has a horizontally long attitude, the remote operation screen 631 shown in FIG. 14 is a case in which the portable information device 200 has a vertically long attitude.

In FIG. 14, the remote operation screen 631 contains a first area 633 and a second area 635. The first area 633 contains a size-changed screen 500D, and the second area 635 contains a hard key screen 637.

The size-changed screen 500D is a screen obtained by reducing spaces between multiple components along the vertical direction in the operation screen shown in FIG. 10 in a predetermined proportion. For example, in the size-changed screen 500D, the space between the component 511 and the component 521 is smaller than that between the component 511 and the component 521 in the operation screen 500. Thus, the size-changed screen 500D has a horizontally longer shape than the operation screen 500.

The hard key screen 637 is a screen in which soft key images associated with multiple hard keys, respectively, are arranged according to the hard key information shown in FIG. 8. Specifically, areas for the first to seventh subgroups 421 to 427 included in the second group with the highest priority are reserved along the sub-array direction. Since an area of a size sufficient for arranging multiple soft key images associated with multiple hard keys, respectively, defined by the hard key information is present in the hard key screen 637, areas for the first to seventh subgroups 421 to 427 are arranged in the vertical direction that is the sub-array direction in the order of the first to seventh subgroups 421 to 427 regardless of the sub-priorities. Furthermore, three soft key images associated with three hard keys, respectively, included in each of the second to fifth subgroups 422 to 425 are arranged in the horizontal direction that is the array direction.

Five soft key images associated with five hard keys, respectively, included in the first group 410 with the next highest priority are arranged in the vertical direction that is the array direction, three soft key images associated with three hard keys, respectively, included in the fourth group 440 with the next highest priority are arranged in the horizontal direction that is the array direction, and three soft key images associated with three hard keys, respectively, included in the third group 430 with the lowest priority is arranged in the horizontal direction that is the array direction.

Figure 15:
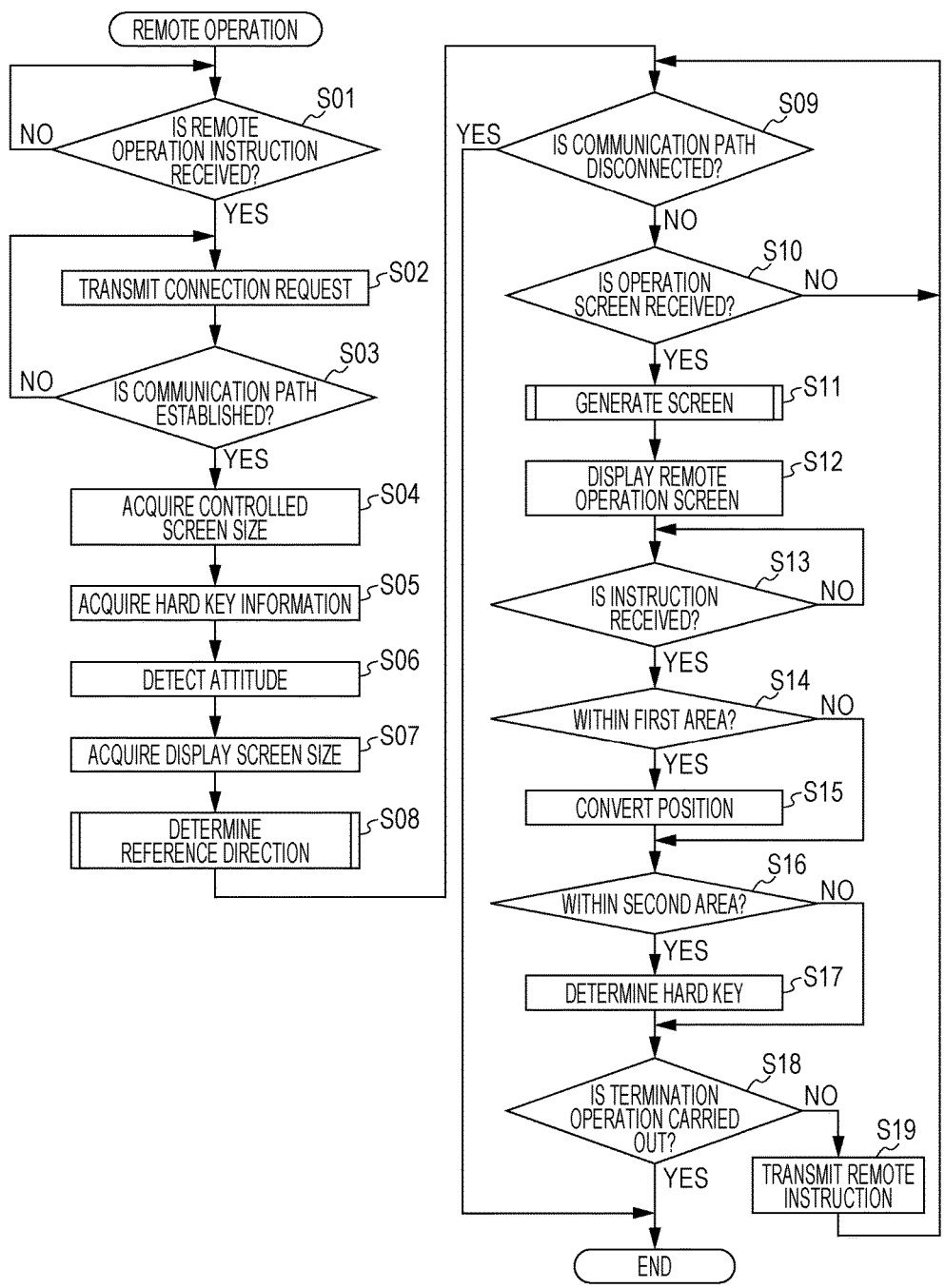
FIG. 15 is a flowchart showing an example of a flow of a remote operation process according to the first embodiment.

FIG. 15 is a flowchart showing an example of a flow of a remote operation process according to the first embodiment. The remote operation process is a process executed by the CPU 201 included in the portable information device 200 by executing remote operation programs stored in the flash memory 203 or the CD-ROM 211A by the CPU 201. The remote operation programs include a screen generation program. In FIG. 15, the CPU 201 determines whether or not a remote operation instruction is received (step S01). If the operation unit 207 receives a remote operation instruction input by the user, the remote operation instruction is received. A standby state is entered and kept until a remote operation instruction is received (NO in step S01), and the process proceeds to step S02 if a remote operation instruction is received (YES in step S01).

In step S02, a connection request is transmitted to the MFP 100. The wireless LAN I/F 208 is controlled to transmit the connection request so as to establish a communication path for communication with the MFP 100. It is then determined whether or not the communication path is established (step S03). The communication path is established through negotiation with the MFP 100. Step S02 is repeated until the communication path is established (NO in step S03), and the process proceeds to step S04 if the communication path is established (YES in step S03).

In step S04, a controlled screen size is acquired from the MFP 100. The controlled screen size is acquired from the MFP 100 via the communication path established in step S03. The controlled screen size is the size of the display surface of the display unit 161 included in the MFP 100. The controlled screen size is the same as the size of a screen displayed on the display unit 161 by the MFP 100, that is, an operation screen herein.

Subsequently, in step S05, hard key information is acquired from the MFP 100. The hard key information is acquired from the MFP 100 via the communication path established in step S03. The hard key information is information associated with each of multiple hard keys included in the hard key unit 167 of the MFP 100. The hard key information contains key identification information for identifying each hard key, group identification information for identifying a group to which the hard key belongs, and an array direction.

Subsequently, in step S06, the attitude is detected. The attitude of the portable information device 200 is detected on the basis of accelerations along three axes output by the acceleration sensor 210. The attitude of the portable information device 200 is either in a vertical direction in which the long side direction of the display unit 206 is closer to the direction of gravitational force than the short side direction thereof and a horizontal direction in which the short side direction of the display unit 206 is closer to the direction of gravitational force than the long side direction thereof.

In step S07, a display screen size is acquired and the process proceeds to step S08. The display screen size is the size of the display surface of the display unit 206. In step S08, a reference direction determination process is executed. The reference direction determination process is a process of determining either one of the vertical direction and the horizontal direction of an operation screen to be the reference direction, details of which will be described later.

In step S09, it is determined whether or not the communication path established in step S03 is disconnected by the MFP 100. The process is terminated if the communication path is disconnected, or otherwise the process proceeds to step S10.

In step S10, it is determined whether or not an operation screen is received. The wireless LAN I/F 208 is controlled to receive an operation screen from the MFP 100. The process proceeds to step S11 if the operation screen is received, or otherwise the process returns to step S09. In step S11, a screen generation process is executed and the process proceeds to step S12. The screen generation process is a process of generating a remote operation screen to be displayed on the display unit 206 on the basis of the operation screen, details of which will be described later.

In step S12, the remote operation screen is displayed on the display unit 206, and the process proceeds to step S13. In step S13, it is determined whether or not an instruction is received. When a position indicated by the user is detected by the touch panel 207B, the instruction is received. A standby state is entered and kept until an instruction is received (NO in step S13), and the process proceeds to step S14 if an instruction is received (YES in step S13).

In step S14, it is determined whether or not the detected position in the remote operation screen is within the first area. The process proceeds to step S15 if the position is within the first area, or otherwise the process proceeds to step S16. In step S15, the position in the remote operation screen is converted into a position in the operation screen, and the process proceeds to step S16. In step S16, it is determined whether or not the detected position in the remote operation screen is within the second area. The process proceeds to step S17 if the position is within the second area, or otherwise the process proceeds to step S18. In step S17, a hard key associated with the detected position is determined, and the process proceeds to step S18. Since a hard key screen is set in the second area of the remote operation screen, a soft key image including the detected position is located from among the soft key images arranged in the hard key screen, and a hard key associated with the located soft key image is determined.

In step S18, it is determined whether or not the received instruction is a termination operation. The process proceeds to step S19 if the instruction is not a termination operation, or the process is terminated if the instruction is a termination operation. In step S19, the wireless LAN I/F 208 is controlled to transmit a remote instruction to the MFP 100, and the process returns to step S09. The remote instruction contains position information indicating the position in the operation screen when step S15 is executed, or in other words, when a position within the first area in the remote operation screen is indicated by the user. The remote operation contains key identification information of the hard key determined in step S17 when step S17 is executed, or in other words, when a position within the second area in the remote operation screen is indicated by the user.

Figure 16:
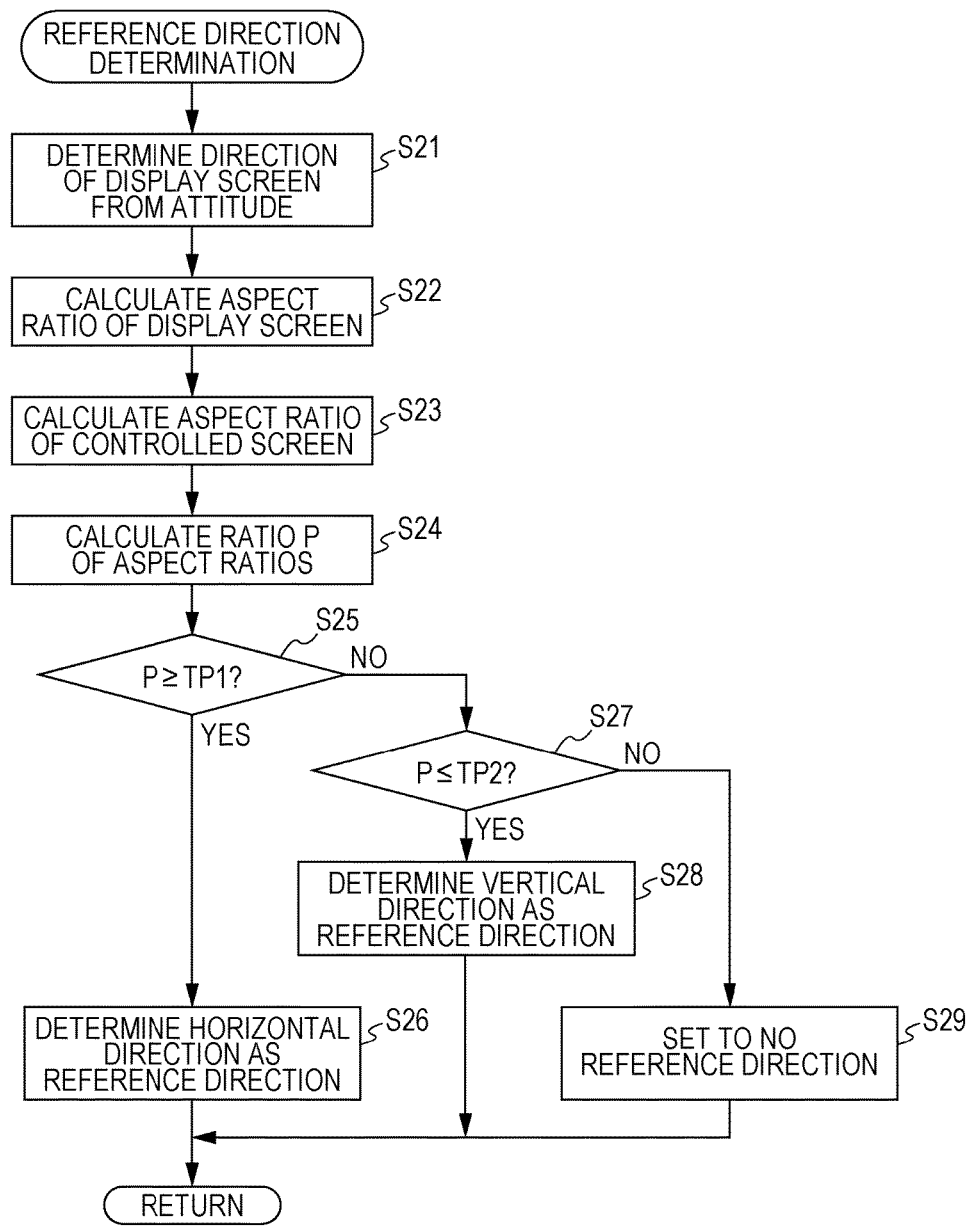
FIG. 16 is a flowchart showing an example of a flow of a reference direction determination process.

FIG. 16 is a flowchart showing an example of a flow of the reference direction determination process. The reference direction determination process is a process executed in step S08 in FIG. 15, and the controlled screen size, the display screen size, and the attitude of the portable information device 200 are detected before step S08 is executed. In FIG. 16, the CPU 201 determines the direction of the display screen from the attitude of the portable information device 200 (step S21). The direction of the display screen is determined according to which of the long side direction and the short side direction of the display screen corresponds to the vertical direction. The direction of the display screen when the long side direction thereof corresponds to the vertical direction is referred to as the vertically long direction, and the direction of the display screen when the short side direction thereof corresponds to the vertical direction is referred to as the horizontally long direction. If the portable information device 200 has an attitude in which the display screen is vertically long, the direction of the display screen is determined to be the vertically long direction. If the portable information device 200 has an attitude in which the display screen is horizontally long, the direction of the display screen is determined to be the horizontally long direction. Note that the direction of the display screen when the display screen has a square shape may be determined to be either of the vertical direction and the horizontal direction independently of the attitude of the portable information device 200.

Subsequently, in step S22, the aspect ratio R1 of the display screen is calculated. The aspect ratio R1 of the display screen is calculated by R1=(the length of the display screen in the vertical direction)/(the length of the display screen in the horizontal direction). The aspect ratio R1 is larger than 1 when the direction of the display screen is the vertically long direction, and the aspect ratio R1 is smaller than 1 when the direction of the display screen is the horizontally long direction. If the display screen has a square shape, the aspect ratio R1 is 1 independently of the attitude of the portable information device 200.

Subsequently, in step S23, the aspect ratio R2 of the controlled screen is calculated. Since the controlled screen size is defined both in the vertical direction and in the horizontal direction, the ratio R2 of the controlled screen is calculated by R2=(the length of the controlled screen in the vertical direction)/(the length of the controlled screen in the horizontal direction).

In step S24, a value obtained by dividing the aspect ratio R1 of the display screen by the aspect ratio R2 of the controlled screen is calculated as a ratio P of the aspect ratios (P=R1/R2). It is then determined whether or not the ratio P of the aspect ratios is equal to or larger than the threshold TP1 (step S25). In other words, it is determined whether or not the display screen is vertically longer than the controlled screen. The threshold TP1 may be any value, but is preferably a value required to ensure the size of the second area in which the hard key screen, which will be described later, is arranged. The process proceeds to step S26 if the ratio P of the aspect ratios is equal to or larger than the threshold TP1, or otherwise the process proceeds to step S27.

In step S27, it is determined whether or not the ratio P of the aspect ratios is equal to or larger than the threshold TP2. In other words, it is determined whether or not the display screen is horizontally longer than the controlled screen. The threshold TP2 may be any value, but is preferably a minimum value required to ensure the size of the second area in which the hard key screen, which will be described later, is arranged. The process proceeds to step S28 if the ratio P of the aspect ratios is equal to or smaller than the threshold TP2, or otherwise the process proceeds to step S29.

In step S28, the vertical direction of the display screen is determined to be the reference direction, and the process is returned to the remote operation process. In step S29, no reference direction is set without determining the reference direction, and the process is returned to the remote operation process.

Figure 17:
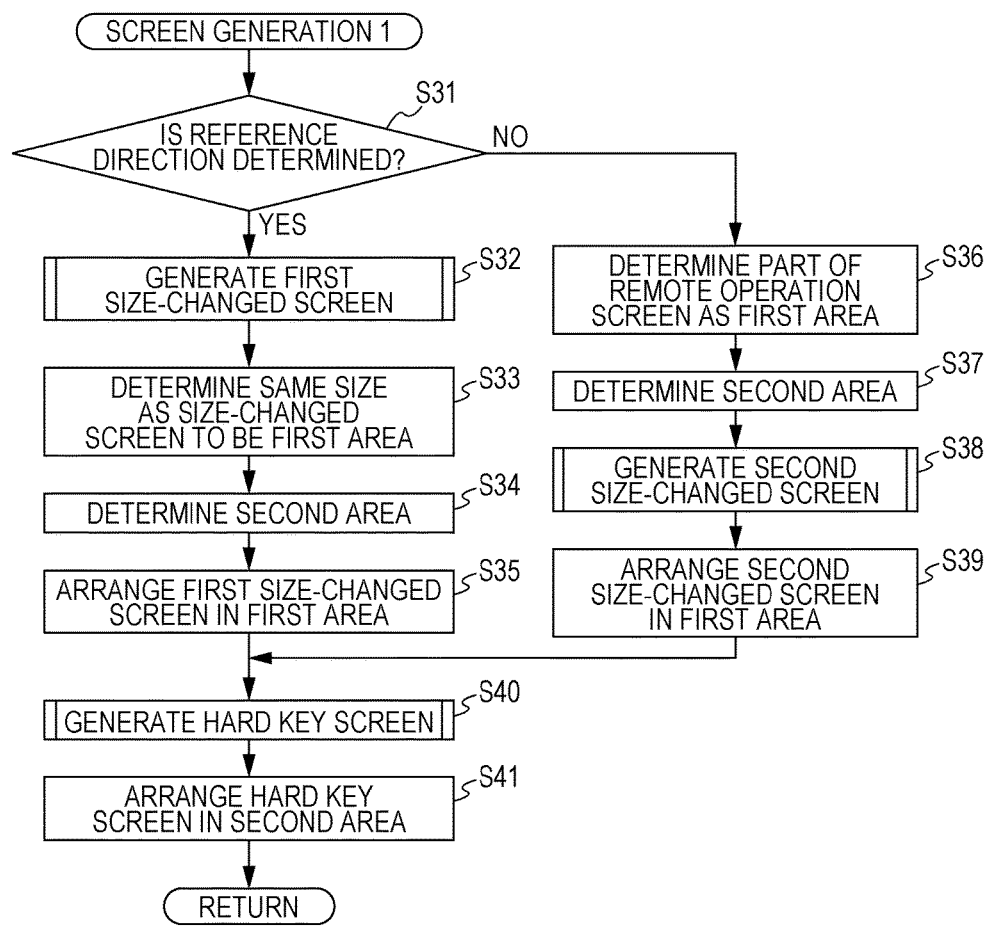
FIG. 17 is a flowchart showing an example of a flow of a screen generation process when an area determination mode is set to a single mode.

FIG. 17 is a flowchart showing an example of a flow of the screen generation process when the area determination mode is set to the single mode. The screen generation process shown in FIG. 17 is a process executed in step S11 of FIG. 15. The reference direction is set to one of the "vertical direction," the "horizontal direction," or "no reference direction" before the screen generation process when the area determination mode is set to the single mode is executed. In FIG. 17, it is determined whether or not the reference direction is determined (step S31). The process proceeds to step S32 if the reference direction is set to either of the "vertical direction" and the "horizontal direction," or otherwise the process proceeds to step S36.

In step S32, a first size-changed screen generation process is executed. The first size-changed screen generation process is a process of generating a size-changed screen by changing the size in a dependent direction that is the direction other than the reference direction of the vertical direction and the horizontal direction of the operation screen, details of which will be described later. Subsequently, in step S33, an area of the same size as the size-changed screen in the remote operation screen is determined to be the first area. The remote operation screen is a screen of the same size as the controlled screen.

Subsequently, in step S34, an area other than the first area in the remote operation screen is determined to be the second area. In step S35, the first size-changed screen is arranged in the first area of the operation screen, and the process proceeds to step S40.

The case where the process proceeds to step S36 is a case in which the reference direction is set to "no reference direction." In this case, the ratio P of the aspect ratios calculated from the aspect ratio of the controlled screen and the aspect ratio of the display screen is larger than the threshold TP2 and smaller than the threshold TP1 and the aspect ratio of the controlled screen and the aspect ratio of the display screen are substantially the same. In step S36, part of the remote operation screen is determined to be the first area. The size of the first area may be determined in advance. For example, an area of a predetermined proportion of the size of the remote operation screen is determined to be the first area. Specifically, an area of a size of 80% of the sizes in the vertical direction and the horizontal direction of the remote operation screen is determined to be the first area.

In step S37, an area other than the first area in the remote operation screen is determined to be the second area. Subsequently, in step S38, a second size-changed screen generation process is executed, and the process proceeds to step S39. The second size-changed screen generation process is a process of generating a second size-changed screen by changing the sizes both in the vertical direction and the horizontal direction of the operation screen, details of which will be described later. In step S39, the second size-changed screen is arranged in the first area of the remote operation screen, and the process proceeds to step S40.

In step S40, a hard key screen generation process is executed, and the process proceeds to step S41. The hard key screen generation process is a process of generating a hard key screen in which one or more soft key images associated with one or more hard keys, respectively, defined by the hard key information are arranged, details of which will be described later. The hard key screen is of the same size as the second area. In step S41, the generated hard key screen is arranged in the second area of the remote operation screen, and the process is returned to the remote operation process.

Figure 18:
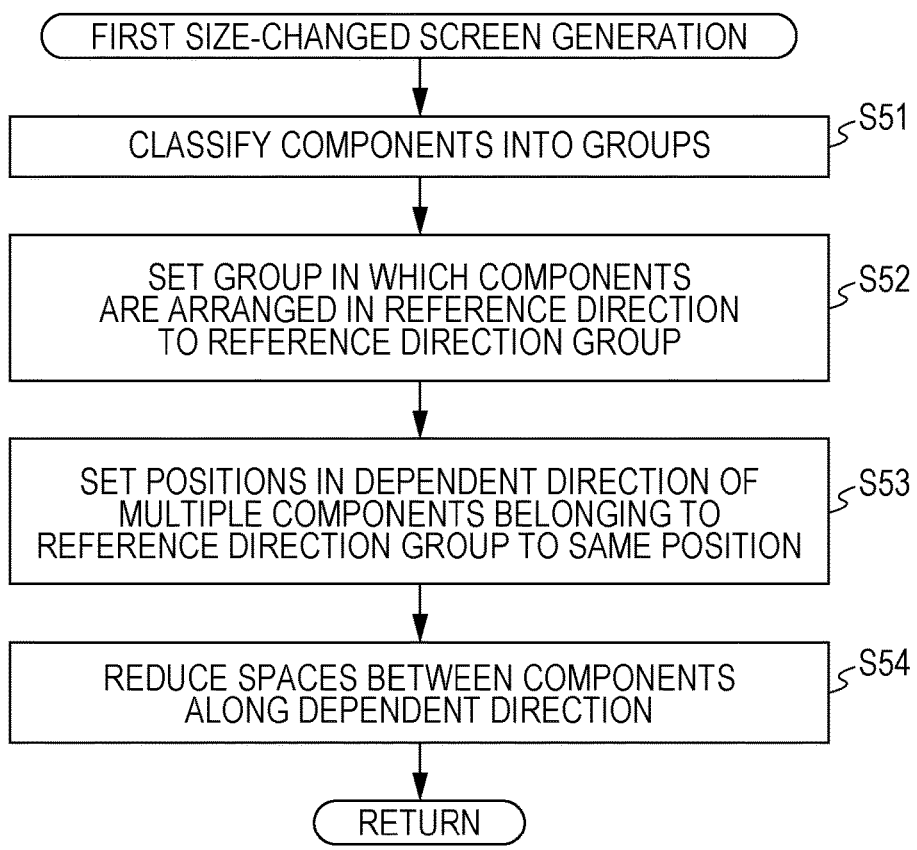
FIG. 18 is a flowchart showing an example of a flow of a first size-changed screen generation process.

FIG. 18 is a flowchart showing an example of a flow of the first size-changed screen generation process. The first size-changed screen generation process is a process executed in step S32 of FIG. 17. In FIG. 18, one or more components contained in the operation screen are classified into groups (step S51). When the operation screen is a web page written in a markup language, related components are classified into the same group by analyzing the web page. For example, when an item name and an entry field of a set value are included as components, the item name and the entry field of the set value associated with the item are classified into the same group. Furthermore, multiple item names arranged in the same column or in the same row are classified into the same group. Furthermore, when the operation screen is image data, the components are extracted by analyzing the image data. For example, a rectangular area containing a series of characters is extracted as one component. An area enclosed by a line is also extracted as one component. Furthermore, components at the same vertical position among multiple components are classified into the same group, and components at the same horizontal position are classified into the same group.

Subsequently, in step S52, a group in which components are arranged in the reference direction is set to a reference direction group. When the reference direction is the horizontal direction, a group in which components are arranged in the horizontal direction is set to the reference direction group. The positions in the dependent direction of the components contained in the reference direction group are then set to the same position in step S53. When a group to which components belong is the reference direction group, even if the position of a component in the dependent direction varies, the positions of the other components in the dependent direction are all set to the same position.

Subsequently, in step S54, spaces between the components along the dependent direction are reduced, and the process returns to the screen generation process. For example, when the reference direction is the horizontal direction, spaces between the components along the vertical direction are reduced at a predetermined magnification. If, however, the positions in the vertical direction of the components belonging to the reference direction group do not become the same position as a result of the reduction, the magnification is determined so that the positions in the vertical direction of the components belonging to the reference direction group become the same position and the spaces between the components along the vertical direction are reduced.

Figure 19:
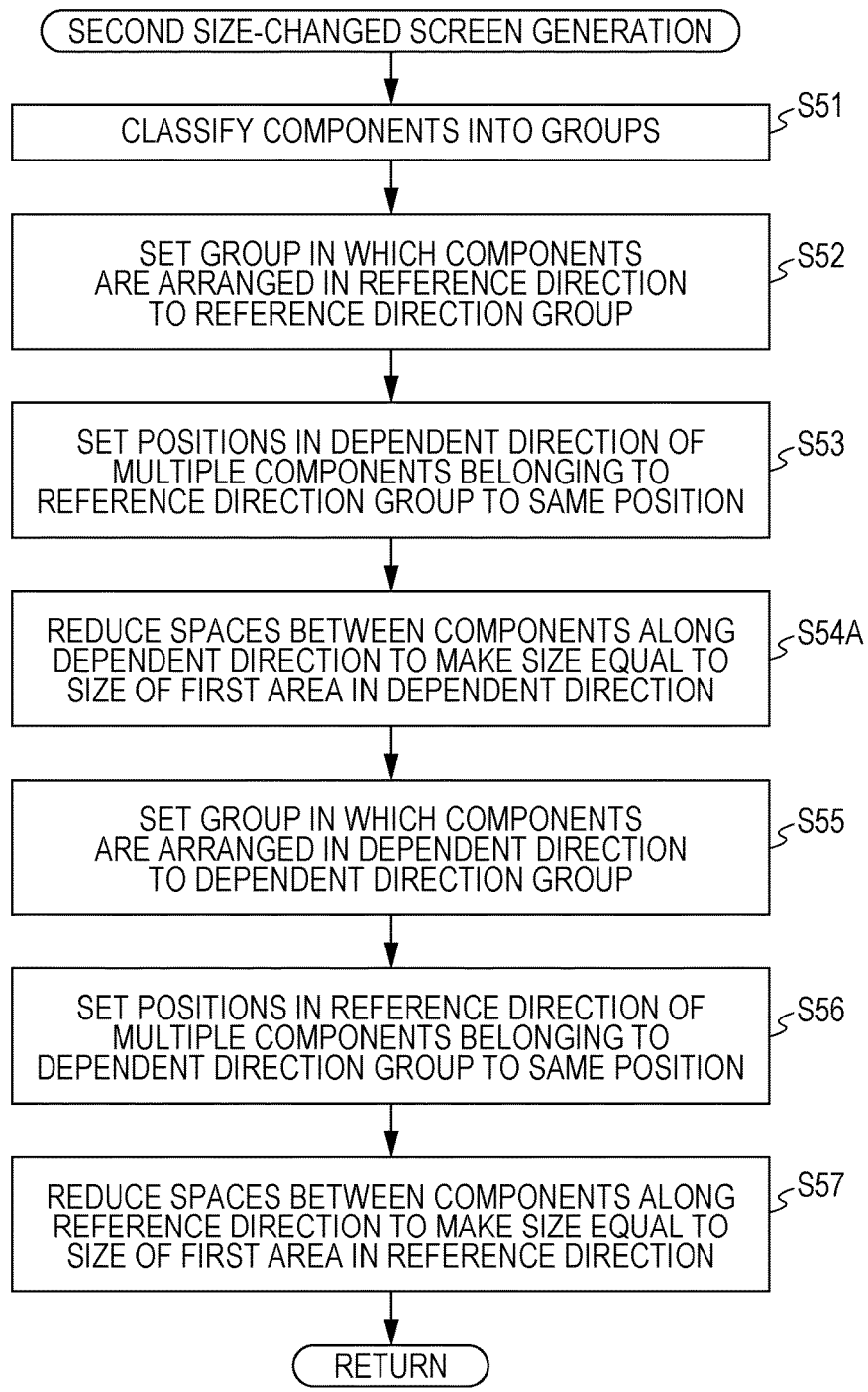
FIG. 19 is a flowchart showing an example of a flow of a second size-changed screen generation process.

FIG. 19 is a flowchart showing an example of a flow of the second size-changed screen generation process. The second size-changed screen generation process is a process executed in step S38 of FIG. 17. The size of the first area is determined in step S36 before the second size-changed screen generation process is executed. In FIG. 19, the processes in steps S51 to S53 are the same as those in steps S51 to S53 shown in FIG. 18. The description thereof is thus not repeated here.

In step S54A, spaces between components along the dependent direction are reduced to make the size of the operation screen in the dependent direction equal to the size of the first area in the dependent direction. Note that the spaces are reduced so that the positions in the vertical direction of the components belonging to the reference direction group become the same position.

Subsequently, in step S55, a group in which components are arranged in the dependent direction is set to a dependent direction group. When the dependent direction is the vertical direction, a group in which components are arranged in the vertical direction is set to a dependent direction group. The positions in the reference direction of the components contained in the dependent direction group are then set to the same position (step S56). When a group to which components belong is the dependent direction group, even if the position of a component in the reference direction varies, the positions of the other components in the reference direction are all set to the same position.

Subsequently, in step S57, spaces between components along the reference direction are reduced to make the size of the operation screen in the reference direction equal to the size of the first area in the reference direction. Note that the spaces are reduced so that the positions in the reference direction of the components belonging to the dependent direction group become the same position.

Figure 20:
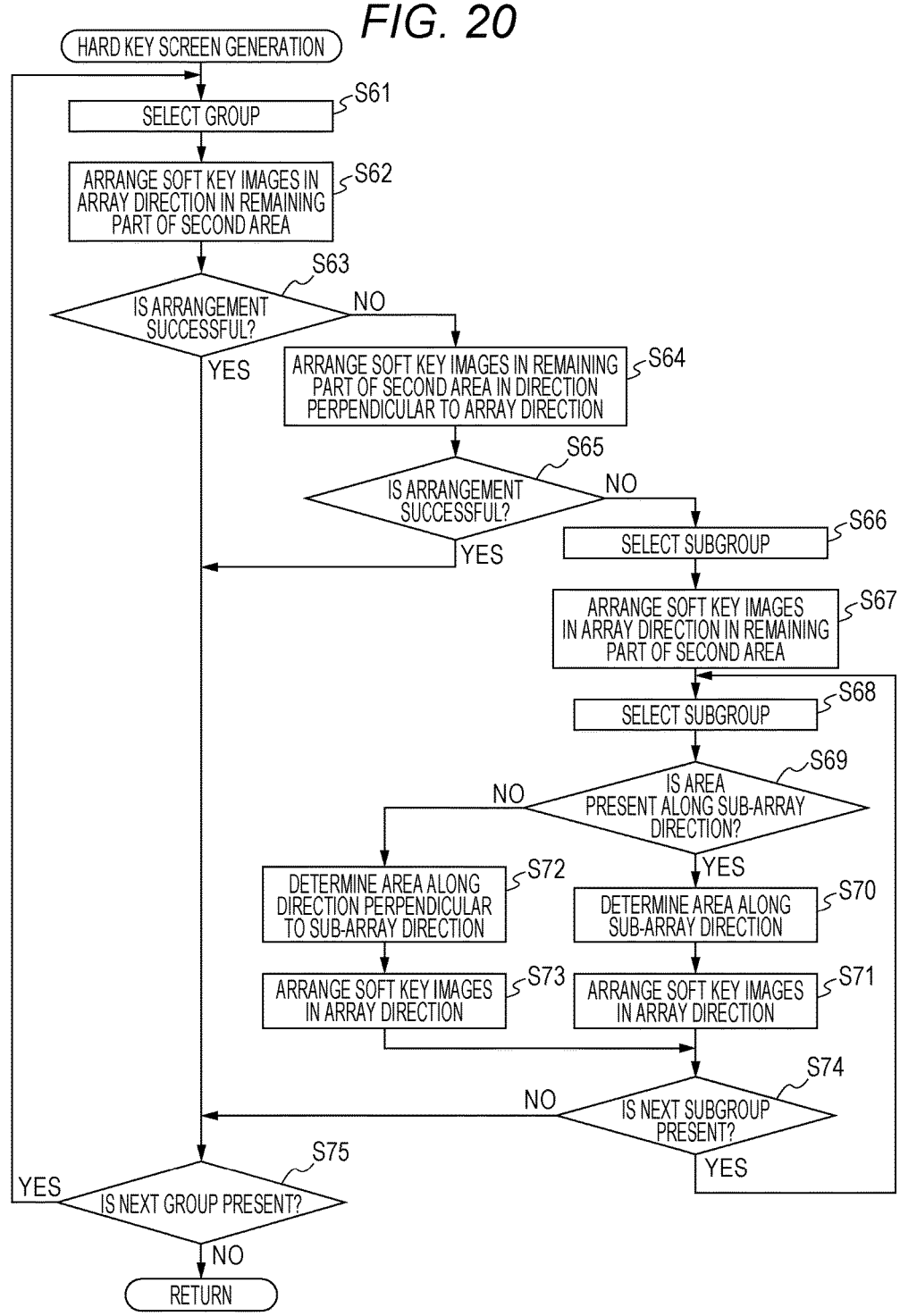
FIG. 20 is a flowchart showing an example of a flow of a hard key screen generation process.

FIG. 20 is a flowchart showing an example of a flow of the hard key screen generation process. The hard key screen generation process is a process executed in step S40 of FIG. 17. The size of the second area is determined in step S34 or step S37 executed before the hard key generation process is executed. In FIG. 20, CPU 201 selects a group (step S61). When priorities are assigned to the groups, one group with the highest priority is selected. Multiple soft key images associated with multiple hard keys, respectively, included in the group are arranged in the array direction defined for the group in the remaining part of the second area (step S62). Subsequently, in step S63, it is determined whether or not the arrangement of the soft key images is successful. The process proceeds to step S75 if the arrangement is successful, or the process proceeds to step S64 if the arrangement is not successful. The arrangement is not successful when there is no sufficient remaining space for arranging all the soft key images.

In step S64, multiple soft key images associated with multiple hard keys, respectively, included in the group are arranged in a direction perpendicular to the array direction defined for the group in the remaining part of the second area. Subsequently, in step S65, it is determined whether or not the arrangement of the soft key images is successful. The process proceeds to step S75 if the arrangement is successful, or the process proceeds to step S66 if the arrangement is not successful. The arrangement is not successful when there is no sufficient remaining space for arranging all the soft key images.

In step S66, one subgroup is selected from multiple subgroups included in the group. When priorities are assigned to the subgroups, a subgroup with the highest priority is selected. Multiple soft key images associated with multiple hard keys, respectively, included in the subgroup are arranged in the array direction defined for the group in which the subgroup is included in the remaining part of the second area (step S67).

In step S68, one unselected subgroup is selected from multiple subgroups included in the group. When priorities are assigned to the subgroups, a subgroup with the highest priority is selected. It is determined whether or not an area is present along the sub-array direction with respect to the arranged soft key images. The process proceeds to step S70 if the area is present, or otherwise the process proceeds to step S72. In step S70, an area present along the sub-array direction with respect to the arranged soft key images is determined to be the area to be processed next. Multiple soft key images associated with multiple hard keys, respectively, included in the subgroup are then arranged in the determined area in the array direction defined for the group in which the subgroup is included (step S71), and the process proceeds to step S74.

In step S72, an area present along the direction perpendicular to the sub-array direction with respect to the arranged soft key images is determined to be the area to be processed next. Multiple soft key images associated with multiple hard keys, respectively, included in the subgroup are then arranged in the determined area in the array direction defined for the group in which the subgroup is included (step S73), and the process proceeds to step S74.

In step S74, it is determined whether or not an unselected subgroup is present. The process returns to step S68 if a subgroup that is not yet selected as a subgroup to be processed is present, or otherwise the process proceeds to step S75. In step S75, it is determined whether or not an unselected group is present. The process returns to step S61 if a group that is not yet selected as a group to be processed is present, or otherwise the process returns to the screen generation process.

Figure 21:
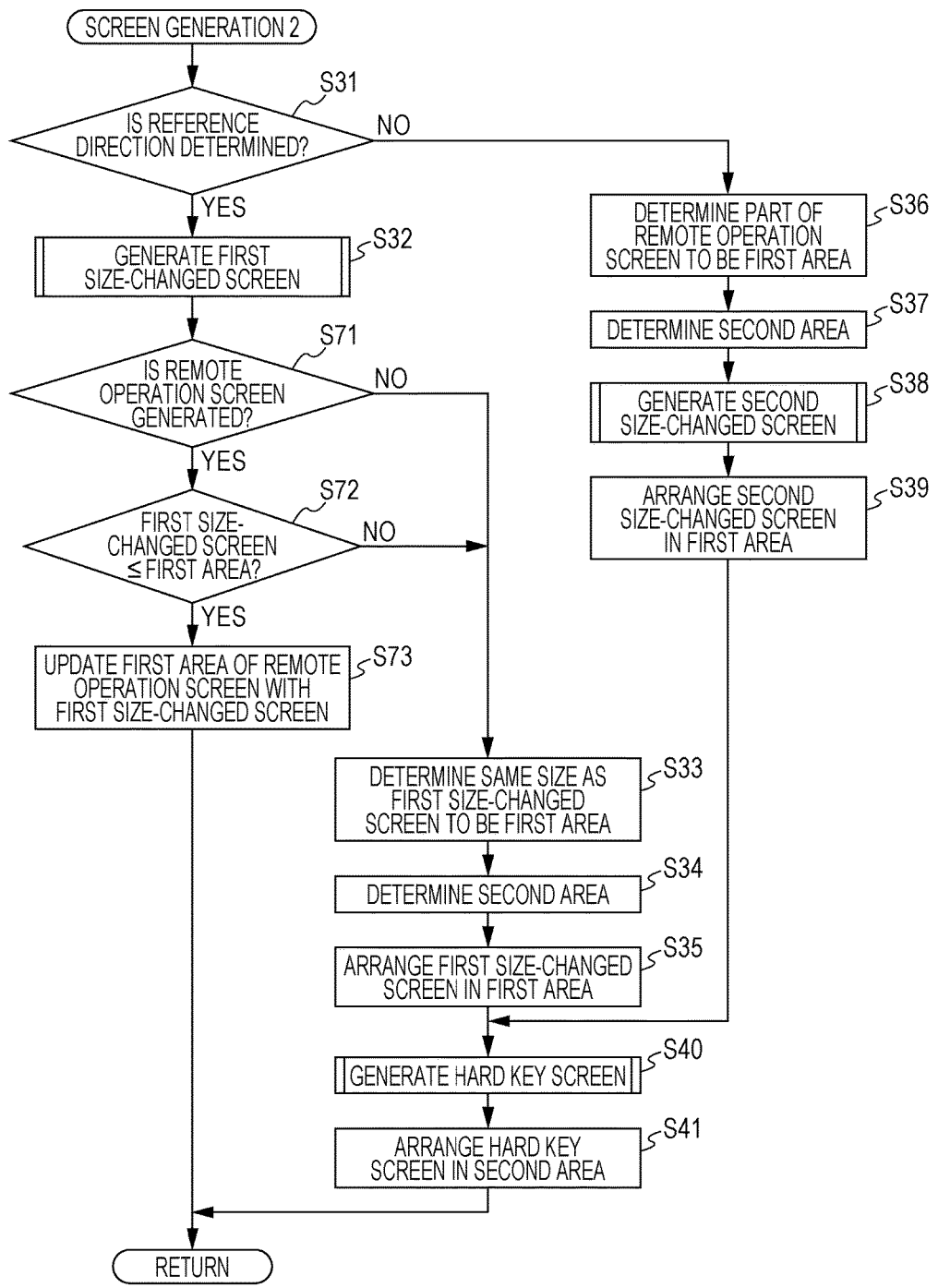
FIG. 21 is a flowchart showing an example of a flow of a screen generation process when the area determination mode is set to a continuous display mode.

FIG. 21 is a flowchart showing an example of a flow of the screen generation process when the area determination mode is set to the continuous display mode. The screen generation process shown in FIG. 21 is a process executed in step S11 of FIG. 15. The reference direction is set to one of the "vertical direction," the "horizontal direction," or "no reference direction" before the screen generation process when the area determination mode is set to the continuous display mode is executed. In FIG. 21, the difference from FIG. 17 lies in that steps S71 to S73 are added between steps S33 and S34. Since the other processes are the same as those shown in FIG. 17, the description thereof will not be repeated here. After the first size-changed screen is generated in step S32, it is determined in the next step S71 whether or not an already generated remote operation screen is present. The process proceeds to step S72 if the remote operation screen is present, or the process proceeds to step S33 if the remote operation screen is not present.

In step S72, it is determined whether or not the size of the first size-changed screen generated in step S32 is equal to or smaller than the size of the first area of the remote operation screen. Here, it is determined whether or not the length in the dependent direction of the first size-changed screen is equal to or smaller than that in the dependent direction of the first area when the first size-changed screen is reduced until the length in the reference direction of the first size-changed screen becomes equal to the length in the reference direction of the first area. The process proceeds to step S73 if the size of the first size-changed screen is equal to or smaller than that of the first area of the remote operation screen, or otherwise the process proceeds to step S33. In step S73, the first area of the already generated remote operation screen is updated with the first size-changed screen generated in step S32, and the process returns to the remote operation process. In this case, since the hard key screen need not be generated, the processing load can be reduced. If the first size-changed screen is smaller than the first area of the remote operation screen, a first size-changed screen whose length in the dependent direction is equal to that of the first area may be generated.

Figure 22:
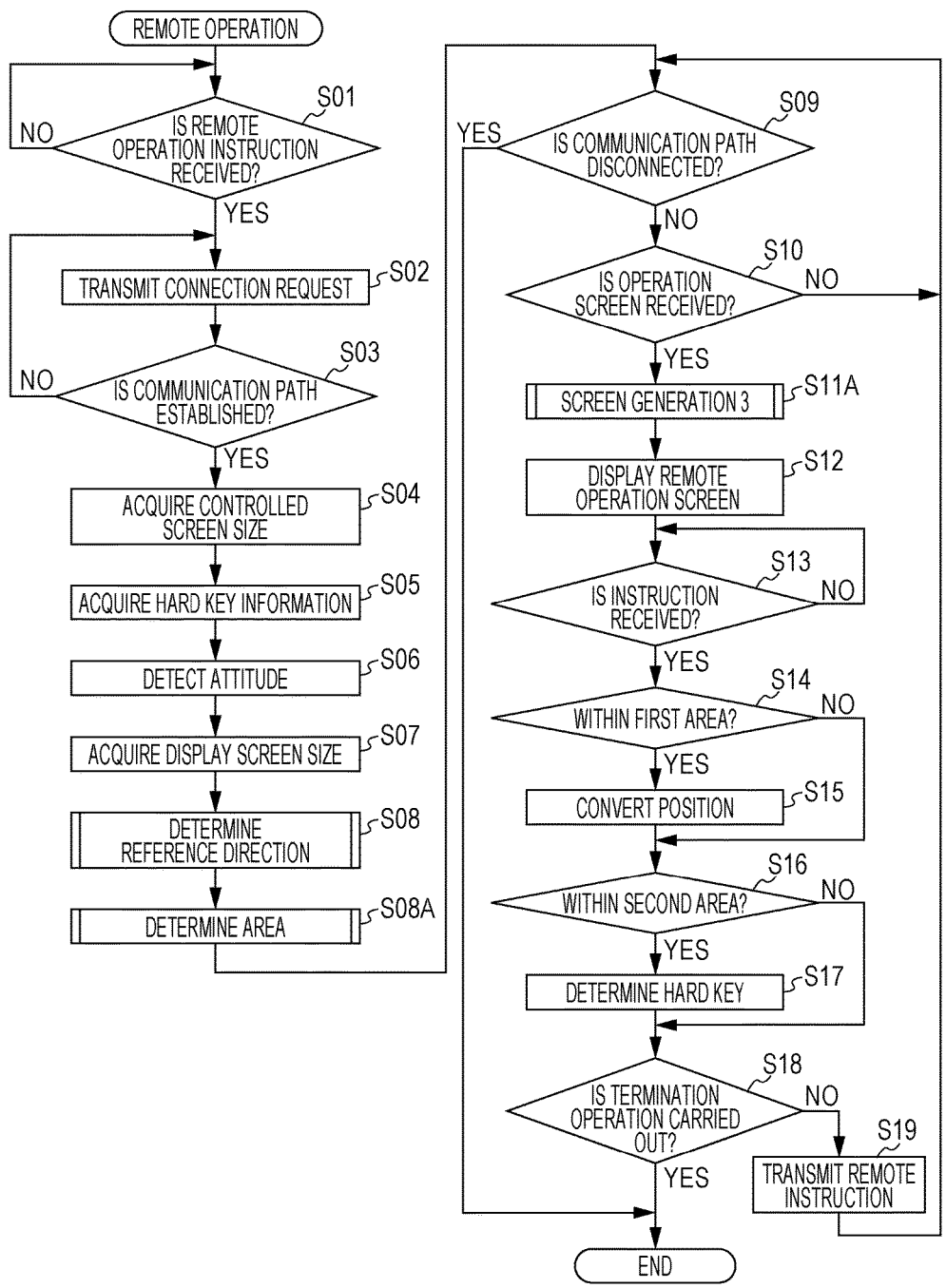
FIG. 22 is a flowchart showing an example of a flow of a remote operation process when the area determination mode is set to a full mode.

FIG. 22 is a flowchart showing an example of a flow of the remote operation process when the area determination mode is set to the full mode. In FIG. 22, the differences from the remote operation process in FIG. 20 lie in that step S08A is added between steps S08 and S09 and that step S11 is modified to step S11A. Since the other processes are the same as those shown in FIG. 20, the description thereof will not be repeated here. After the reference direction is determined in step S08, the CPU 201 executes an area determination process (step S08A). Furthermore, in step S11A, a screen generation process when the area determination mode is set to the full mode is executed.

Figure 23:
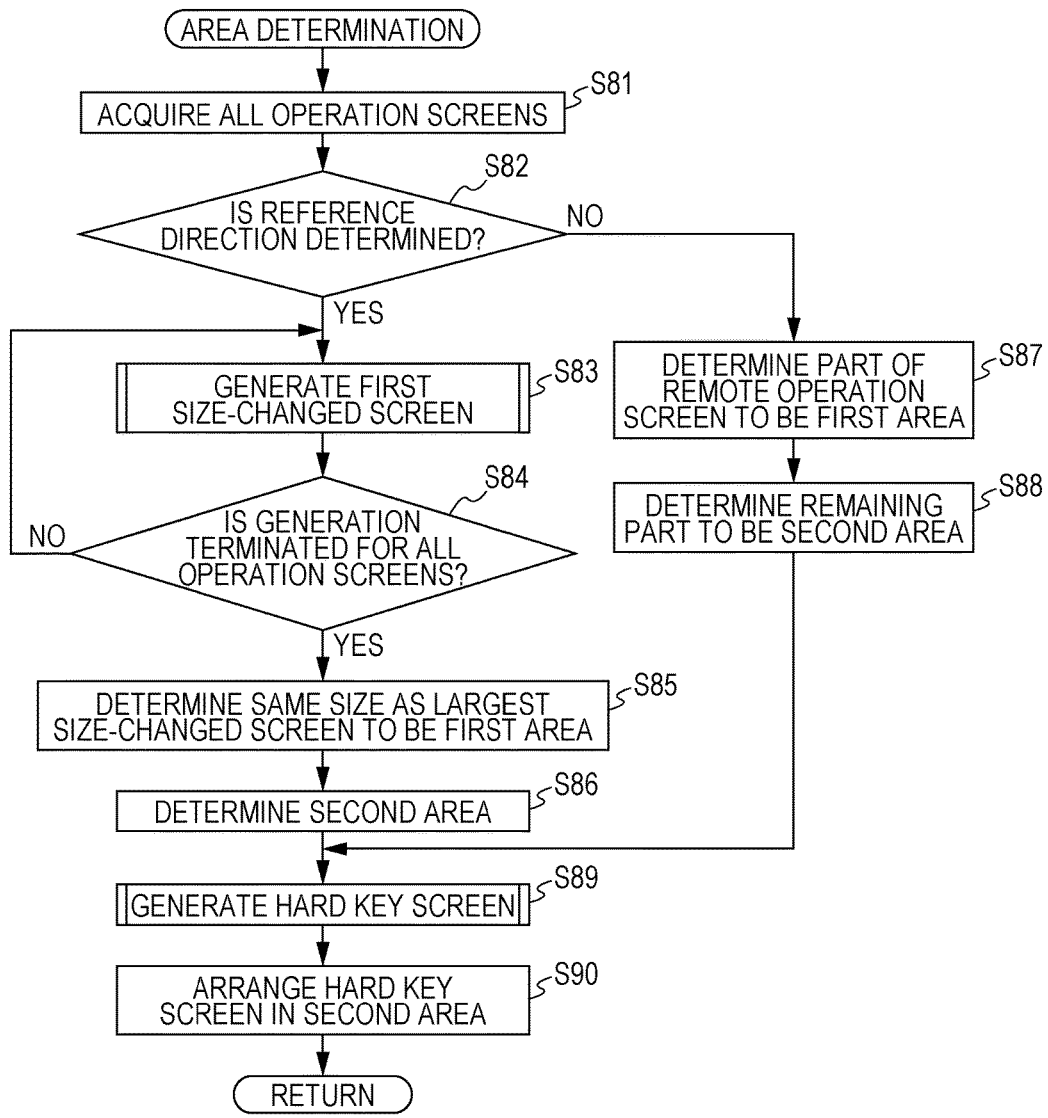
FIG. 23 is a flowchart showing an example of a flow of an area determination process.

FIG. 23 is a flowchart showing an example of a flow of the area determination process. The area determination process is a process executed in step S08A of FIG. 22. In FIG. 23, the CPU 201 acquires all the operation screen from the MFP 100 (step S81). It is then determined whether or not the reference direction is determined (step S82). The process proceeds to step S83 if the reference direction is set to either of the "vertical direction" and the "horizontal direction," or otherwise the process proceeds to step S89.

In step S83, a first size-changed screen generation process is executed for each of all the operation screens acquired in step S81. The first size-changed screen generation process is the same as that shown in FIG. 18 that is a process of generating a size-changed screen by changing the size in the dependent direction that is the direction other than the reference direction of the vertical direction and the horizontal direction of the operation screen. Subsequently, in step S84, it is determined whether or not generation of the first size-changed screen for each of all the operation screens is terminated. The process proceeds to step S85 if generation of the first size-changed screen for each of all the operation screens is terminated, or otherwise the process returns to step S83.

In step S85, an area of the same size as that of the largest first size-changed screen of the first size-changed screens is determined to be the first area for all of the operation screens. An area other than the first area in the remote operation screen is then determined to be the second area (step S86).

The case where the process proceeds to step S87 is a case in which the reference direction is set to "no reference direction." In step S87, part of the remote operation screen is determined to be the first area. The size of the first area may be determined in advance. For example, an area of a predetermined proportion of the size of the remote operation screen is determined to be the first area. Specifically, an area of a size of 80% of the sizes in the vertical direction and the horizontal direction of the remote operation screen is determined to be the first area. Subsequently, in step S88, an area other than the first area in the remote operation screen is determined to be the second area, and the process proceeds to step S89.

In step S89, the hard key screen generation process shown in FIG. 20 is executed, and the process proceeds to step S90. In step S90, the generated hard key screen is arranged in the second area of the remote operation screen, and the process is returned to the remote operation process.

Figure 24:
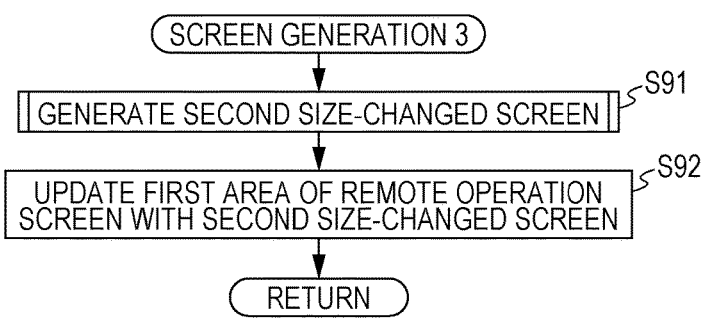
FIG. 24 is a flowchart showing an example of a flow of a screen generation process when the area determination mode is set to the full mode.

FIG. 24 is a flowchart showing an example of a flow of the screen generation process when the area determination mode is set to the full mode. The screen generation process shown in FIG. 24 is a process executed in step S11A of FIG. 22. In FIG. 24, in step S91, the second size-changed screen generation process shown in FIG. 19 is executed, and the process proceeds to step S92. In step S92, the first area of the remote operation screen is updated with the second size-changed screen, and the process returns to the remote operation process.

Figure 25:
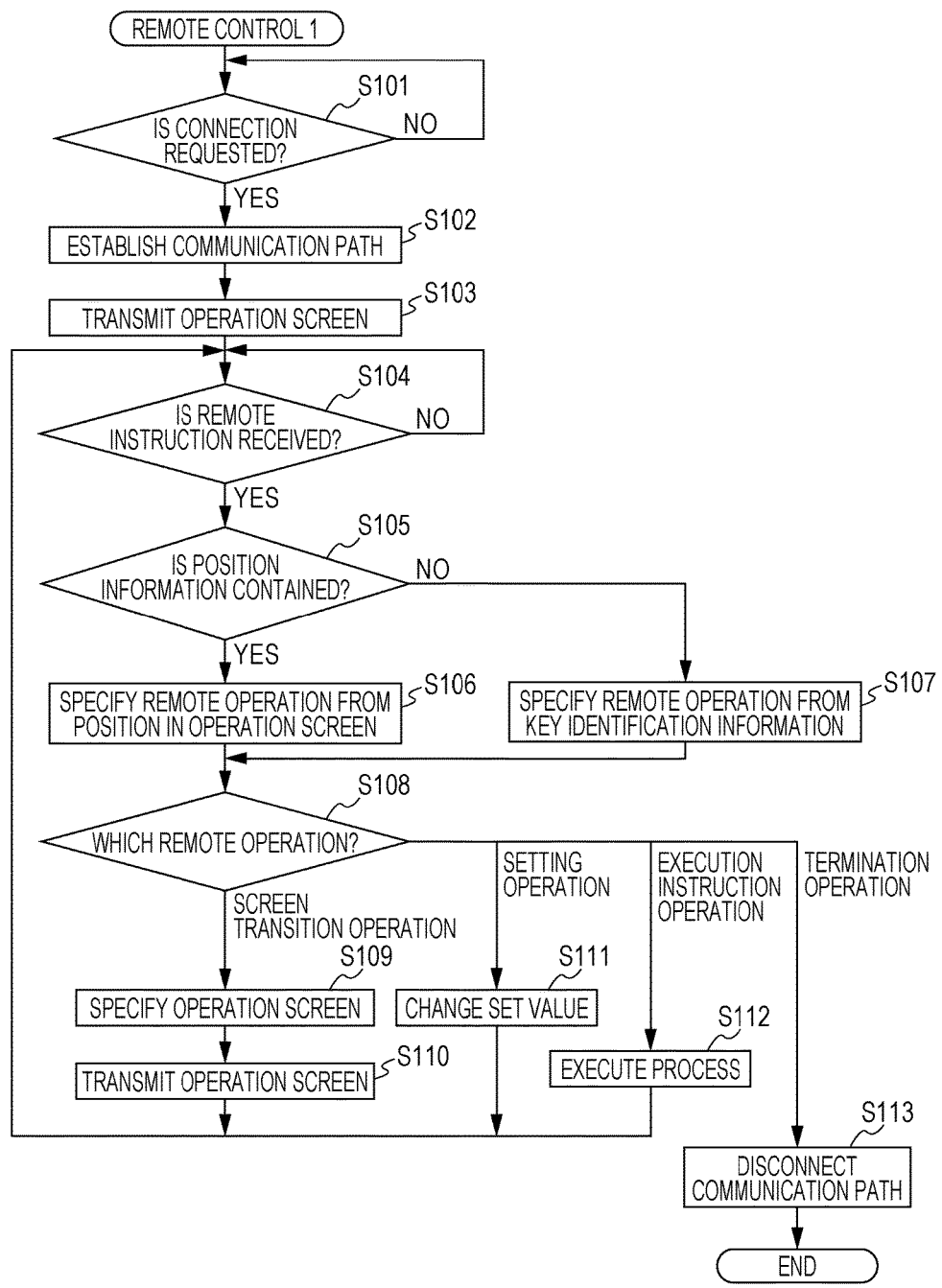
FIG. 25 is a flowchart showing an example of a flow of a remote control process according to the first embodiment.

FIG. 25 is a flowchart showing an example of a flow of the remote control process according to the first embodiment. The remote control process is a process executed by the CPU 111 included in the MFP 100 by executing the remote control programs stored in the ROM 113, the HDD 115, and the CD-ROM 118 by the CPU 111.

In FIG. 25, the CPU 111 determines whether or not a connection request is received (step S101). It is determined whether or not the communication I/F unit 112 has received a connection request from outside. A standby state is entered and kept until a connection request is received, and the process proceeds to step S102 when a connection request is received. Herein, an example in which a connection request is received from the portable information device 200 will be described.

In step S102, a communication path for communication with the portable information device 200 is established. An operation screen is then transmitted to the portable information device 200 that is a remote operation device via the communication I/F unit 112 (step S103), and the process proceeds to step S104.

In step S104, it is determined whether or not a remote instruction is received. A standby state is entered and kept until the communication I/F unit 112 receives a remote instruction the portable information device 200 that is a remote operation device (NO in step S104), and the process proceeds to step S105 if a remote instruction is received (YES in step S104). In step S105, it is determined whether or not the received remote instruction contains position information. The process proceeds to step S106 if the remote instruction contains position information, or otherwise the process proceeds to step S107. In step S106, a remote operation is specified from the position located by the position information contained in the remote instruction in the operation screen transmitted to the portable information device 200 in step S103 or in step S110, which will be described later, and the process proceeds to step S108. For example, a screen transmission operation is specified if the position located in the operation screen is within a transition button, a setting operation is specified if the position located in the operation screen is within an area to which a command for setting a set value is assigned, and an execution instruction operation is specified if the position located in the operation screen is within an area to which an execution command is assigned.

When the process proceeds to step S107, the received remote instruction contains key identification information. In step S107, a remote operation associated with a hard key identified by the key identification information contained in the remote instruction is specified, and the process proceeds to step S108.

In step S108, the process branches according to the specified remote operation. The process proceeds to step S109 if the remote operation is a screen transition operation to switch the display screen, the process proceeds to step S111 if the remote operation is a setting operation to set a set value, the process proceeds to step S112 if the remote operation is an execution instruction operation to instruct to execute a process, or the process proceeds to step S113 if the remote operation is a termination operation to terminate remote control.

In step S109, an operation screen is specified, and the process proceeds to step S110. In step S110, the specified operation screen is transmitted to the portable information device 200 that is a remote operation device via the communication I/F unit 112, and the process returns to step S104. In step S111, the set value is changed to a set value specified by the setting operation, and the process returns to step S104. In step S112, a process specified by the execution instruction operation is executed according to a set value set at the time point, and the process returns to step S104. In step S113, the communication path established in step S102 is disconnected, and the process is terminated.

As described above, the portable information device 200 according to the first embodiment determines a reference direction on the basis of the aspect ratio of the display surface of the display unit 206 and the aspect ratio of the display surface of the display unit 161 of the MFP 100, generates a size-changed screen obtained by changing the size in the dependent direction different from the reference direction of an operation screen to be displayed on the display unit 161 of the MFP 100, determines a first area on the basis of the size-changed screen among remote operation screens, and arranges the size-changed screen in the first area. The layout of the size-changed screen corresponding to an operation screen can thus be a layout similar to that of the operation screen. Furthermore, the portable information device 200 determines an area other than the first area to be a second area, generates a hard key screen in which one or more soft key images associated with one or more hard keys, respectively, on the basis of hard key information relating to one or more hard keys included in the hard key unit 167, and generates a remote operation screen by arranging the hard key screen in the second area. The size of the area in which the hard key screen is arranged in the remote operation screen can thus be made as large as possible.

Furthermore, when a second operation screen is acquired after a first operation screen from the MFP 100 and if the size in the dependent direction of a size-changed screen generated on the basis of the second operation screen is equal to or smaller than that in the dependent direction of a size-changed screen generated on the basis of the first operation screen, the portable information device 200 arranges the size-changed screen corresponding to the second operation screen in the first area determined on the basis of the size-changed screen generated on the basis of the first operation screen without determining the first area on the basis of the size-changed screen generated for the second operation screen. The size of the hard key screen can thus be changed as less as possible in the remote operation screen.

Furthermore, the portable information device 200 generates multiple size-changed screens corresponding to multiple operation screens, respectively, stored in the MFP 100, and determines an area of the same size as the size-changed screens having the largest size of the multiple size-changed screens to be the first area for all the operation screens. The size of the hard key screens can thus be kept from varying in the remote operation screens.

Furthermore, since at least part of both spaces adjacent to two or more components arranged in the dependent direction is deleted so that the positions in the dependent direction of two or more components belonging to the same group and arranged in the reference direction all become the same position in generating a size-changed screen, the layout of the size-changed screen corresponding to an operation screen can thus be a layout similar to that of the operation screen.

Moreover, since one or more soft key images associated with one or more hard keys, respectively, included in the same group are arranged at narrower intervals than those between soft key images associated with one or more hard keys, respectively, included in different groups in generating a hard key screen, soft key images of each group can be arranged together.

Furthermore, since one or more soft key images associated with one or more hard keys, respectively, included in a group are arranged in the array direction and the array direction is changed when the soft key images cannot be arranged in the array direction in generating a hard key screen, one or more soft key images of each group can be arranged in a predetermined direction.

Furthermore, since one or more soft key images are arranged in multiple directions regardless of the array direction defined for each group when one or more soft key images cannot be arranged in the same direction, all of one or more soft key images can be arranged.

Furthermore, since the portable information device 200 generates a remote operation screen provided that an operation screen is a predetermined operation screen, a remote operation screen for an operation screen for which operation on a hard key is not required can be generated without including a hard key screen.

Second Embodiment

In the printing system 1 according to the first embodiment, the portable information device 200 can generate a remote operation screen on the basis of an operation screen displayed at the MFP 100. In a printing system 1A according to a second embodiment, the MFP 100 is configured to generate a remote operation screen on the basis of an operation screen. Hereinafter, the printing system 1A according to the second embodiment will be described.

The general outline of the printing system according to the second embodiment is the same as that of the printing system according to the first embodiment shown in FIG. 1. Furthermore, the overview and the hardware configuration of the MFP 100 according to the second embodiment are the same as the overview shown in FIG. 2 and the hardware configuration shown in FIG. 3. Furthermore, the hardware configuration of the portable information devices 200, 200A, 200B according to the second embodiment is the same as that shown in FIG. 5. The description thereof will thus not be repeated.

Figure 26:
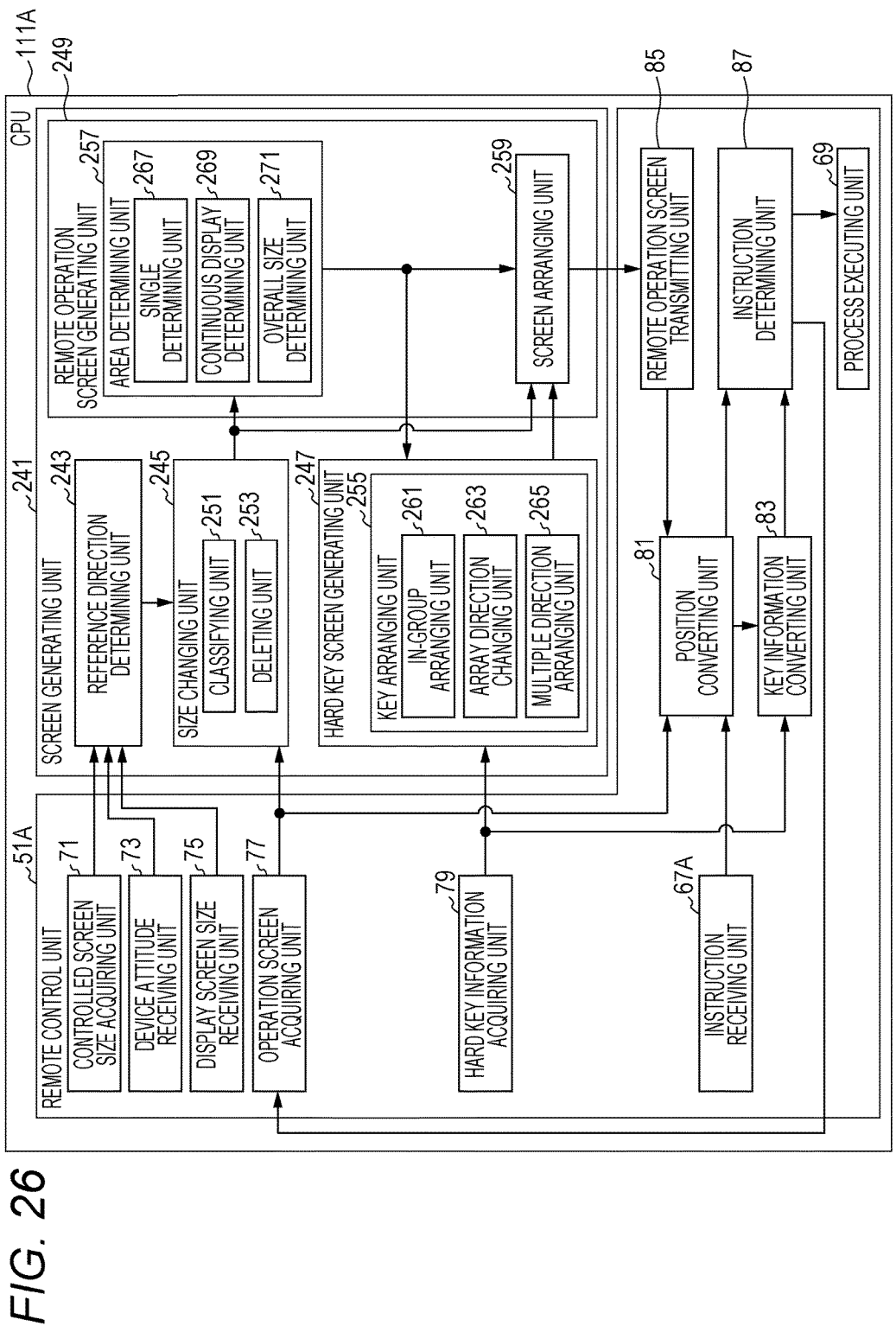
FIG. 26 is a block diagram showing an example of functions of a CPU included in an MFP according to a second embodiment.

FIG. 26 is a block diagram showing an example of functions of the CPU included in the MFP according to the second embodiment. The functions shown in FIG. 26 are functions formed in the CPU 111 included in the MFP 100 according to the second embodiment as a result of executing remote control programs stored in the ROM 113, the HDD 115, and the CD-ROM 118 by the CPU 111. The remote control programs include a screen generation program. In FIG. 26, the CPU 111 includes a remote control unit 51A and a screen generating unit 241. The screen generating unit 241 is the same as the screen generating unit 241 shown in FIG. 9. The description thereof is thus not repeated here.

The remote control unit 51A executes processes according to remote operations received from a remote operation device. The remote control unit 51A controls the communication I/F unit 112 to receive a connection request from the remote operation device and establishes a communication path for communication with the remote operation device. Herein, an example in which a connection request is received from the portable information device 200 that is a remote operation device will be described. In this case, the remote control unit 51A establishes a communication path for communication with the portable information device 200, transmits an operation screen to the portable information device 200 in response to the request from the portable information device 200, and executes a process according to a remote operation received from the portable information device 200.

The remote control unit 51A includes a controlled screen size acquiring unit 71, a device attitude receiving unit 73, a display screen size receiving unit 75, an operation screen acquiring unit 77, a hard key information acquiring unit 79, an instruction receiving unit 67A, a position converting unit 81, a key information converting unit 83, a remote operation screen transmitting unit 85, an instruction determining unit 87, and a process executing unit 69. The process executing unit 69 is the same as the process executing unit 69 shown in FIG. 6. The description thereof will thus not be repeated here.

The controlled screen size acquiring unit 71 acquires the size of the display surface of the display unit 161 as a controlled screen size, and outputs the acquired controlled screen size to the screen generating unit 241. Herein, the controlled screen size is expressed by the number of vertical pixels and the number of horizontal pixels of the display unit 161.

When the communication path for communication with the portable information device 200 is established, the device attitude receiving unit 73 controls the communication I/F unit 112 to receive the attitude of the portable information device 200 from the portable information device 200, and outputs the received attitude of the portable information device 200 to the screen generating unit 241. Since the shape of the display surface of the display unit 206 is a rectangle, the attitude of the portable information device 200 is either in a vertical direction in which the long side direction of the display unit 206 is closer to the direction of gravitational force than the short side direction thereof and a horizontal direction in which the short side direction of the display unit 206 is closer to the direction of gravitational force than the long side direction thereof.

When the communication path for communication with the portable information device 200 is established, the display screen size receiving unit 75 controls the communication I/F unit 112 to receive a display screen size from the portable information device 200, and outputs the received display screen size to the screen generating unit 241. The display screen size is the size of the display surface (display screen) of the display unit 206.

The operation screen acquiring unit 77 reads out one of multiple operation screens stored in the HDD 115, and outputs the read operation screen to the screen generating unit 241 and the position converting unit 81. When a screen transition instruction is input from the instruction determining unit 87, which will be described later, the operation screen acquiring unit 77 reads out an operation screen specified by screen identification information contained in the screen transition information from the HDD 115, and outputs the operation screen to the screen generating unit 241 and the position converting unit 81.

The hard key information acquiring unit 79 reads out hard key information stored in advance in the HDD 115, and outputs the read hard key information to the screen generating unit 241 and the key information converting unit 83. The hard key information contains key identification information for identifying each of hard keys included in the hard key unit 167 of the operation unit 163, group identification information for identifying a group to which the hard key belongs, and an array direction. The hard key information further contains subgroup identification information for identifying each of multiple subgroups in association with the group identification information for a group defining multiple subgroups, key identification information of each of hard keys contained in the subgroup, a sub-array direction in which the subgroups are arranged, and a sub-priority of each of the pieces of subgroup identification information. The sub-array direction is associated with a group and defines the direction in which multiple subgroups are arranged. The direction is defined in association with an operation screen, and includes an horizontal direction parallel to the horizontal direction of the operation screen and a vertical direction parallel to the vertical direction of the operation screen. The hard key information defines, for one or more hard keys included in the group, one or more hard keys included in each of multiple subgroups.

The remote operation screen transmitting unit 85 receives as input a remote control screen, a first area, and a second area from the remote operation screen generating unit 249. The remote operation screen transmitting unit 85 controls the communication I/F unit 112 to transmit a remote operation screen to the portable information device 200 that is a remote operation device. With the transmission of a remote operation screen, the remote operation screen transmitting unit 85 also outputs the remote operation screen, the first area, and the second area to the position converting unit 81.

The instruction receiving unit 67A controls the communication I/F unit 112 to receive a remote instruction transmitted from the portable information device 200 that is a remote operation device. The remote instruction contains position information indicating a position in the remote operation screen. The instruction receiving unit 67A outputs the received remote instruction to the position converting unit 81.

The position converting unit 81 receives as input the remote operation screen, the first area, and the second area from the remote operation screen transmitting unit 85, the remote instruction from the instruction receiving unit 67A, and the operation screen from the operation screen acquiring unit 77. The first area of the remote operation screen contains the size-changed screen corresponding to the operation screen.

The position converting unit 81 locates a position in the remote operation screen on the basis of the position information contained in the remote instruction. If the located position is in the first area of the remote operation screen, the position converting unit 81 locates a position in the size-changed screen, and converts the located position into a position in the operation screen. The position converting unit 283 converts the position to a position in the same component in the operation screen as the component present at the position located in the size-changed screen. The position converting unit 81 outputs position information indicating the position in the operation screen resulting from the conversion to the instruction determining unit 87.

If the position in the remote operation screen located on the basis of the position information is in the second area of the remote operation screen, the position converting unit 81 outputs the hard key screen and the position information indicating the position in the second area to the key information converting unit 83.

The key information converting unit 83 receives as input the hard key information from the hard key information acquiring unit 79 and the hard key screen and the position information indicating the position in the second area from the position converting unit 81. The key information converting unit 83 specifies a soft key image arranged at the position located by the position information indicating the position in the second area among one or more soft key images contained in the hard key screen. The key information converting unit 83 specifies key identification information associated with the specified soft key image, and outputs the specified key identification information to the instruction determining unit 87.

The instruction determining unit 87 specifies a remote operation on the basis of the position in the operation screen located by the position information input from the position converting unit 81. Remote operations include a setting operation for setting a set value, a screen transition operation for changing a set screen, and an execution instruction operation for instructing execution of a process. If the position located in the operation screen by the position information input from the position converting unit 81 is within a transition button, a screen transmission operation is specified. If the position located in the operation screen by the position information input from the position converting unit 81 is within an area to which a command for setting a set value is assigned, a setting operation is specified. If the position located in the operation screen by the position information input from the position converting unit 81 is within an area to which an execution command is assigned, an execution instruction operation is specified. When key identification information is input from the key information converting unit 83, the instruction determining unit 87 specifies a remote operation associated with a hard key specified by the key identification information.

When a setting operation is specified on the basis of the remote operation, the instruction determining unit 87 outputs a setting command instructing to set a set value specified by the setting operation to the process executing unit 69. When an execution instruction operation is specified on the basis of the remote operation, the instruction determining unit 87 outputs an execution command instructing to execute a process specified by the execution instruction operation to the process executing unit 69. When a screen transition operation is specified on the basis of the remote operation, the instruction determining unit 87 outputs a screen transition instruction containing screen identification information for identifying an operation screen specified by the screen transition operation to the operation screen acquiring unit 77.

Figure 27:
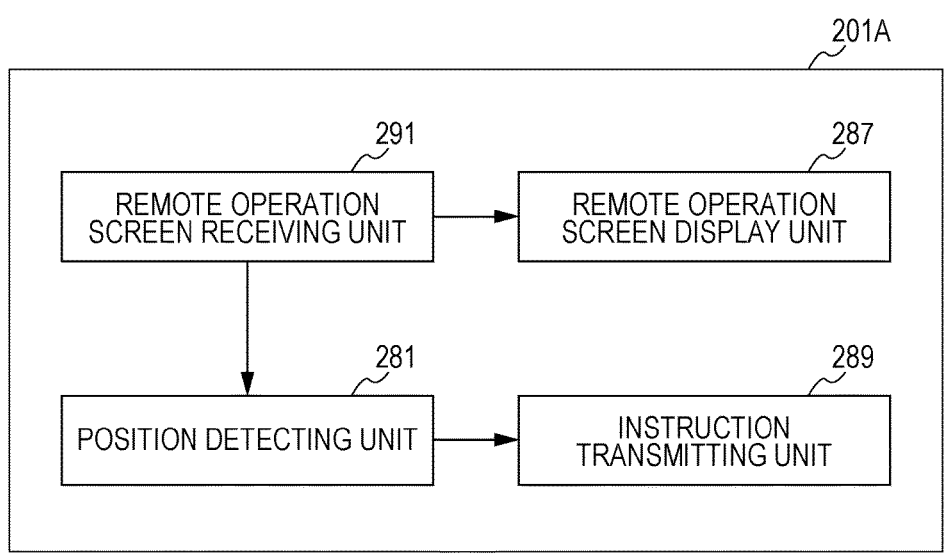
FIG. 27 is a block diagram showing an example of an outline of functions of a CPU included in a portable information device according to the second embodiment.

FIG. 27 is a block diagram showing an example of an outline of functions of the CPU included in the portable information device according to the second embodiment. The functions shown in FIG. 27 are functions formed by the CPU 201 included in the portable information device 200 according to the second embodiment by executing remote operation programs stored in the flash memory 203 or the CD-ROM 211A by the CPU 201. In FIG. 27, the CPU 201 includes a remote operation screen receiving unit 291, a remote operation screen display unit 287, a position detecting unit 281, and an instruction transmitting unit 289.

When the communication path for communication with the MFP 100 is established, the remote operation screen receiving unit 291 controls the wireless LAN I/F 208 to receive a remote operation screen from the MFP 100 and outputs the received remote operation screen to the remote operation screen display unit 287 and the position detecting unit 281. The remote operation screen display unit 287 displays the remote operation screen input from the remote operation screen receiving unit 291 to the display unit 206.

The position detecting unit 281 controls the touch panel 207B, and when the touch panel 207B detects a position indicated by the user, locates a position in the remote operation screen input from the remote operation screen receiving unit 291 on the basis of the detected position. The position detecting unit 281 outputs position information indicating the position in the remote operation screen to the instruction transmitting unit 289. The instruction transmitting unit 289 transmits a remote instruction containing the position information input from the position detecting unit 281 to the MFP 100 via the wireless LAN I/F 208.

Figure 28:
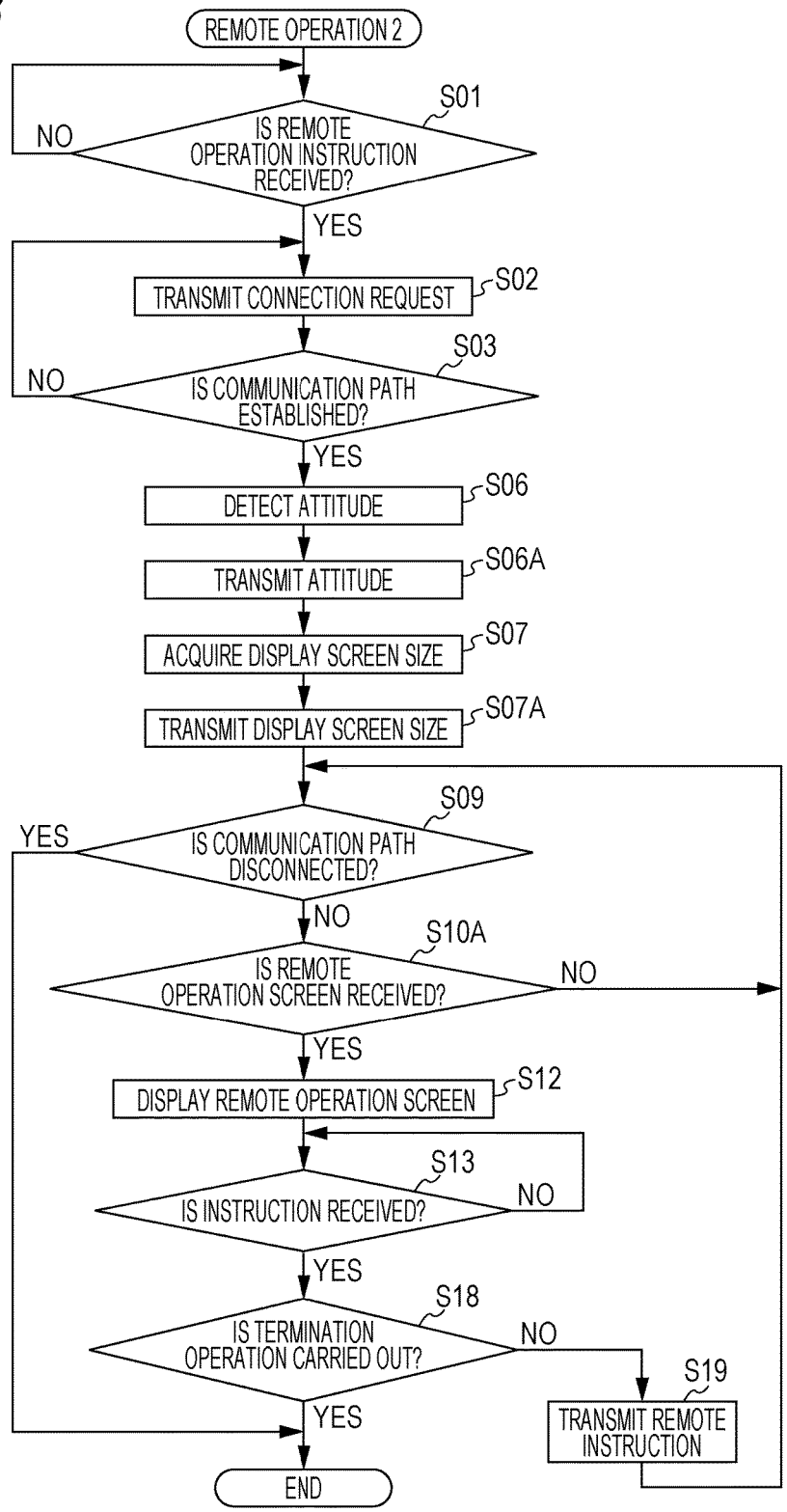
FIG. 28 is a flowchart showing an example of a flow of a remote operation process according to the second embodiment.

FIG. 28 is a flowchart showing an example of a flow of a remote operation process according to the second embodiment. Differences from the remote operation process in the first embodiment shown in FIG. 15 lie in that steps S06A and S07A are added, that step S10 is modified to step S10A, and that steps S08, S11, S14 to S17 are deleted. The other processes are the same as those in the remote operation process according to the first embodiment shown in FIG. 15. Hereinafter, the difference from the remote operation process according to the first embodiment shown in FIG. 15 will be mainly described.

In step S06A, the attitude detected in step S06 is transmitted to the MFP 100 via the wireless LAN I/F 208, and the process proceeds to step S07. In step S07A, the display screen size acquired in step S07 is transmitted to the MFP 100 via the wireless LAN I/F 208, and the process proceeds to step S09.

In step S09, it is determined whether or not the communication path established in step S03 is disconnected by the MFP 100. The process is terminated if the communication path is disconnected, or otherwise the process proceeds to step S10A.

In step S10A, it is determined whether or not a remote operation screen is received. The wireless LAN I/F 208 is controlled to receive the remote operation screen from the MFP 100. The process proceeds to step S12 if the remote operation screen is received, or otherwise the process returns to step S09.

In step S12, the remote operation screen is displayed on the display unit 206, and the process proceeds to step S13. In step S13, it is determined whether or not an instruction is received. A standby state is entered and kept until an instruction is received (NO in step S13), and the process proceeds to step S18 if an instruction is received (YES in step S13). In step S18, it is determined whether or not the received instruction is a termination operation. The process proceeds to step S19 if the instruction is not a termination operation, or the process is terminated if the instruction is a termination operation. In step S19, the wireless LAN I/F 208 is controlled to transmit a remote instruction containing position information indicating the position specified by the instruction received in step S13 to the MFP 100, and the process returns to step S09.

Figure 29:
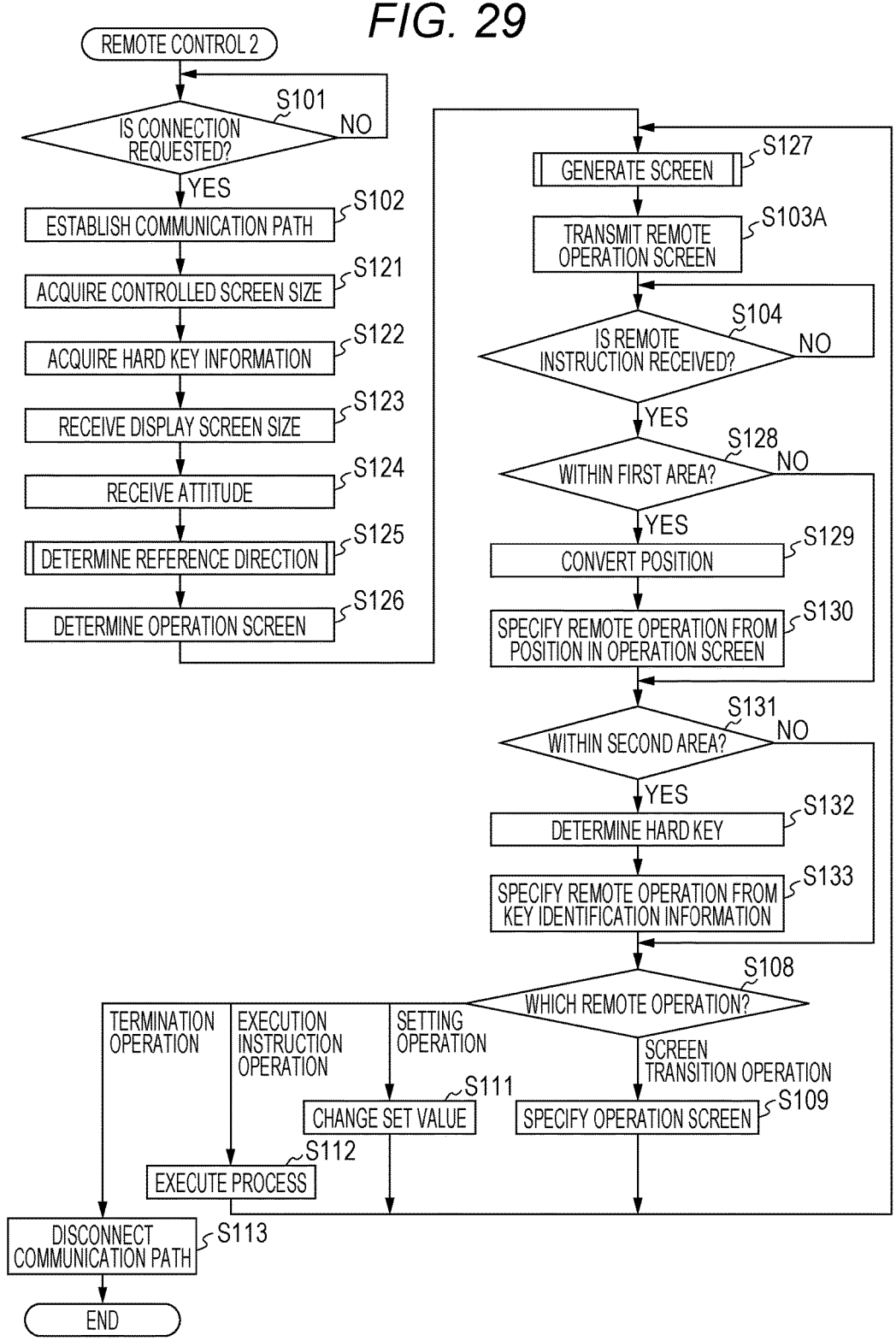
FIG. 29 is a flowchart showing an example of a flow of a remote control process according to the second embodiment.

FIG. 29 is a flowchart showing an example of a flow of the remote control process according to the second embodiment. The remote control process is a process executed by the CPU 111 included in the MFP 100 according to the second embodiment by executing the remote control programs stored in the ROM 113, the HDD 115, and the CD-ROM 118 by the CPU 111. The remote control programs include a screen generation program. Note that processes that are the same as those shown in FIG. 25 are designated by the same reference numerals.

In FIG. 29, the CPU 111 determines whether or not a connection request is received (step S101). It is determined whether or not the communication I/F unit 112 has received a connection request from outside. A standby state is entered and kept until a connection request is received, and the process proceeds to step S102 when a connection request is received. Herein, an example in which a connection request is received from the portable information device 200 will be described.

In step S102, a communication path for communication with the portable information device 200 is established. A controlled screen size is then acquired (step S121). The controlled screen size is the size of the display surface of the display unit 161. Subsequently, in step S122, hard key information is acquired. The hard key information is information associated with each of multiple hard keys included in the hard key unit 167 of the MFP 100, and stored in the HDD 115 in advance. The hard key information contains key identification information for identifying each hard key, group identification information for identifying a group to which the hard key belongs, and an array direction.

Subsequently, in step S123, a display screen size is received from the portable information device 200 via the communication path established in step S03. The display screen size is the size of the display surface of the display unit 206 of the portable information device 200. In step S124, an attitude is received from the portable information device 200 via a communication path established in step S03.

Subsequently, in step S125, the reference direction determination process shown in FIG. 16 is executed. In the next step S126, the operation screen acquiring unit 77 determines one specified operation screen out of multiple operation screens stored in the HDD 115 and reads out the specified operation screen. Subsequently, in step S127, the screen generation process is executed and the process proceeds to step S103A. The screen generation process executed in step S127 is the screen generation process shown in FIG. 17 when the area determination mode is set to the single mode or the screen generation process shown in FIG. 21 when the area determination mode is set to the continuous display mode.

Subsequently, in step S103A, a remote operation screen generated as a result of executing the screen generation process is transmitted to the portable information device 200 via the communication path established in step S102. As a result, the remote operation screen is displayed at the portable information device 200.

Subsequently, in step S104, it is determined whether or not a remote instruction is received. A standby state is entered and kept until the communication I/F unit 112 receives a remote instruction from the portable information device 200 that is a remote operation device (NO in step S104), and the process proceeds to step S128 if a remote instruction is received (YES in step S104). In step S128, it is determined whether or not the position in the remote operation screen specified by the position information contained in the received remote instruction is within the first area. The process proceeds to step S129 if the position is within the first area, or otherwise the process proceeds to step S131.

In step S129, the position in the remote operation screen is converted into a position in the operation screen, and the process proceeds to step S130. In step S130, a remote operation screen is specified on the basis of the position in the operation screen, and the process proceeds to step S131. For example, a screen transmission operation is specified if the position located in the operation screen is within a transition button, a setting operation is specified if the position located in the operation screen is within an area to which a command for setting a set value is assigned, and an execution instruction operation is specified if the position located in the operation screen is within an area to which an execution command is assigned.

In step S131, it is determined whether or not the position in the remote operation screen specified by the position information contained in the received remote instruction is within the second area. The process proceeds to step S132 if the position is within the second area, or otherwise the process proceeds to step S108. In step S132, a hard key associated with the detected position is determined, and the process proceeds to step S133. Since a hard key screen is set in the second area of the remote operation screen, a soft key image including the detected position is located from among the soft key images arranged in the hard key screen, and a hard key associated with the located soft key image is determined. In step S133, a remote operation associated with the determined hard key is specified, and the process proceeds to step S108.

In step S108, the process branches according to the remote operation specified in step S130 or step S133. The process proceeds to step S109 if the remote operation is a screen transition operation to switch the operation screen, the process proceeds to step S111 if the remote operation is a setting operation to set a set value, the process proceeds to step S112 if the remote operation is an execution instruction operation to instruct to execute a process, or the process proceeds to step S113 if the remote operation is a termination operation to terminate remote control.

In step S109, an operation screen is specified, and the process returns to step S127. In step S111, the set value is changed to a set value specified by the setting operation, and the process returns to step S127. In step S112, a process specified by the execution instruction operation is executed according to a set value set at the time point, and the process returns to step S127. In step S113, the communication path established in step S102 is disconnected, and the process is terminated.

Figure 30:
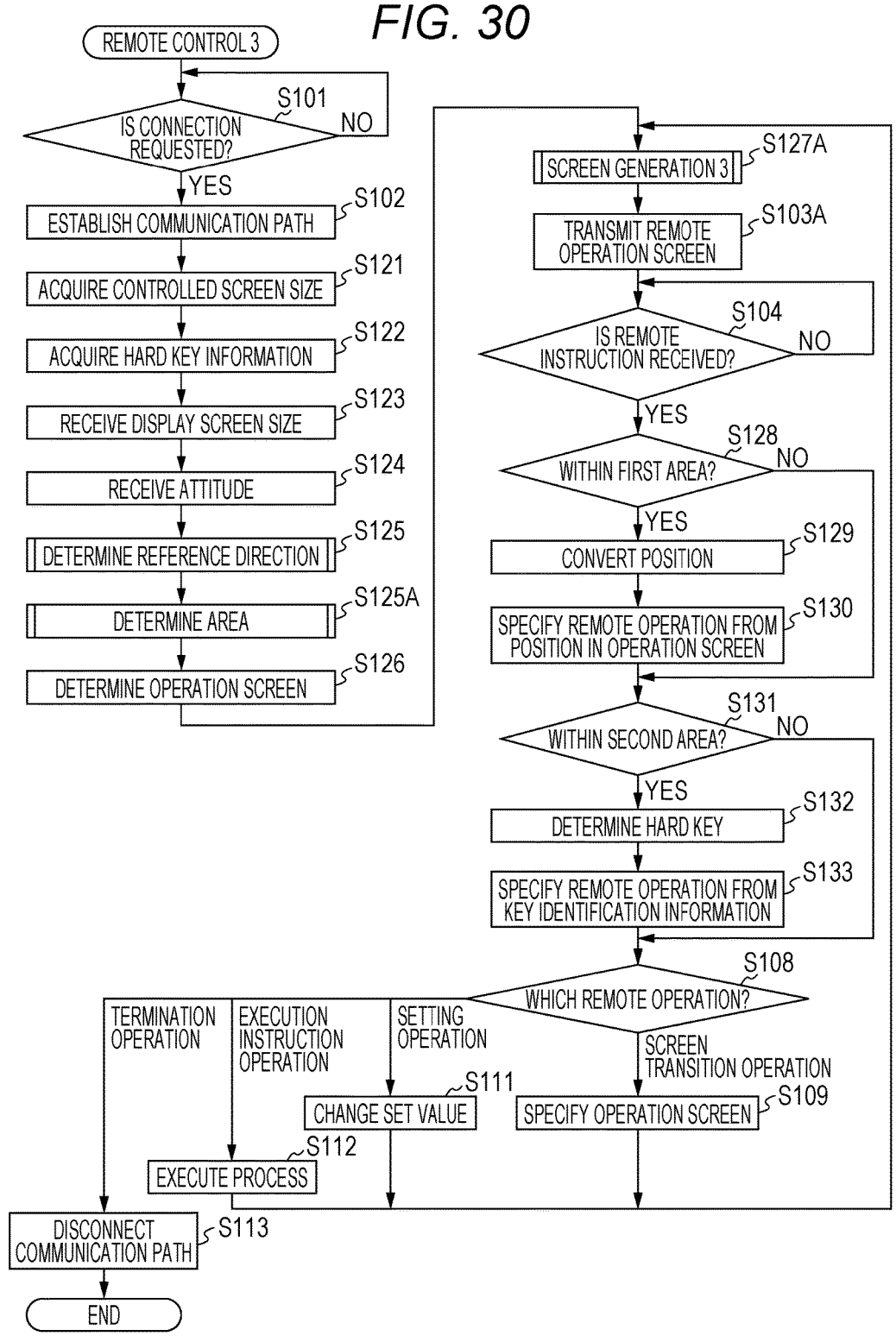
FIG. 30 is a flowchart showing an example of a flow of a remote operation process according to the second embodiment when the area determination mode is set to the full mode.

FIG. 30 is a flowchart showing an example of a flow of the remote operation process according to the second embodiment when the area determination mode is set to the full mode. In FIG. 30, the differences from the remote operation process in FIG. 29 lie in that step S125A is added between steps S125 and S126 and that step S127 is modified to step S127A. Since the other processes are the same as those shown in FIG. 29, the description thereof will not be repeated here. After the reference direction is determined in step S125, the CPU 201 executes the area determination process shown in FIG. 23 (step S125A). Furthermore, in step S127A, the screen generation process when the area determination mode is set to the full mode shown in FIG. 24 is executed.

As described above, the MFP 100 according to the second embodiment can produce the same effects in generating a remote operation screen to be displayed on the portable information device 200 as those produced by the portable information device 200 according to the first embodiment in producing a remote operation screen.

Although the portable information device 200 and the MFP 100 are described as examples of the screen generation device in the embodiments described above, it is needless to say that the invention can alternatively be defined as a screen generation method for making the portable information device 200 execute the remote operation processes shown in FIGS. 15 to 24, a screen generation program for causing the CPU 201 controlling the portable information device 200 to execute the screen generation method, or a screen generation program for causing the MFP 100 to execute the remote control processes shown in FIGS. 29 and 30, a screen generation program for causing the CPU 111 controlling the MFP 100 to execute the screen generation method.

It is to be understood that the embodiments disclosed herein are by way of illustration and example only and is not to be taken by way of limitation in any respect. The scope of the present invention is not defined by the above description but defined by the claims, and is intended to include all possible modifications equivalent to and within the scope of the claims.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A screen generation device comprising a hardware processor configured to:
   determine one of a vertical direction and a horizontal direction to be a reference direction on the basis of an aspect ratio of a display surface of a first display unit of a first device and an aspect ratio of a display surface of a second display unit of a second device;
   generate a size-changed screen by changing a size in a dependent direction of an operation screen to be displayed on the first display unit, the dependent direction being a direction different from the determined reference direction, wherein the dependent direction is one of a vertical direction and a horizontal direction;
   generate a hard key screen in which one or more soft key images associated with one or more hard keys, respectively, are arranged on the basis of hard key information concerning the one or more hard keys;
   generate a remote operation screen in which the size-changed screen and the hard key screen are arranged;
   in the remote operation screen, determine a first area on the basis of the size-changed screen and determine an area other than the first area to be a second area;
   in the remote operation screen, arrange the size-changed screen in the first area and the hard key screen in the second area; and
   in the remote operation screen, arrange one or more soft key images in the hard key screen, wherein the hard key screen is the same size as the second area, wherein positions of soft key images are determined based on respective pieces of hard key information;
   wherein in the size-changed screen, respective spaces between display components in the operation screen are reduced in only one of the vertical direction and the horizontal direction according to the aspect ratio of the display surface of the first display unit and the aspect ratio of the display surface of the second display unit, and the display components are reduced at a predetermined magnification;
   wherein the hardware processor is further configured to determine the vertical direction to be the reference direction when a proportion of the aspect ratio of the display surface of the first display unit to the aspect ratio of the display surface of the second display unit is equal to or larger than a first threshold or determine the horizontal direction to be the reference direction when a proportion of the aspect ratio of the display surface of the first display unit to the aspect ratio of the display surface of the second display unit is equal to or smaller than a second threshold;
   wherein the first threshold and the second threshold are values ensuring a minimum size of the second area in the remote operation screen.

2. The screen generation device according to claim 1, wherein the hardware processor-is further configured not to, when an operation screen acquiring unit acquires a second operation screen after the operation screen acquiring unit acquires a first operation screen, determine the first area on the basis of the size-changed screen generated by the size changing unit from the second operation screen if the size in the dependent direction of the size-changed screen generated on the basis of the second operation screen by the size changing unit is equal to or smaller than the size in the dependent direction of the size-changed screen generated on the basis of the first operation screen by the size changing unit.

3. The screen generation device according to claim 1, wherein the hardware processor-is further configured to:
   generate multiple size-changed screens of multiple operation screens, respectively; and
   determine an area of a size equal to the size of the largest size-changed screen of the multiple size-changed screens to be a first area for all of the multiple operation screens before an operation screen is received by an operation screen acquiring unit.

4. The screen generation device according to claim 1, wherein the hardware processor-is further configured to:
   classify multiple components included in the operation screen into one or more groups; and
   delete at least a part of spaces adjacent to each of two or more components arranged in the dependent direction so that orientations of two or more components arranged in a same reference direction group are all the same.

5. The screen generation device according to claim 1, wherein
   the hard key information contains group information of each of groups into which the one or more hard keys are classified, and
   the hardware processor-is further configured to arrange one or more soft key images associated with one or more hard keys, respectively, included in a group at narrower intervals than intervals between soft key images associated with one or more hard keys included in different groups and located at the closest positions.

6. The screen generation device according to claim 1, wherein group information defines, for each of a plurality of groups, a direction in which one or more hard keys included in the group are arranged, and the hardware processor-is further configured to arrange, for each of the groups, one or more soft key images associated with the one or more hard keys, respectively, included in the group in an array direction defined for the group in the second area, and change the array direction when the soft key images cannot be arranged in the array direction defined for the group.

7. The screen generation device according to claim 6, wherein the hardware processor is further configured to arrange the one or more soft key images in multiple directions regardless of the array direction defined for the group when the one or more soft key images cannot be arranged in the second area when the array direction is changed by an array direction changing unit.

8. The screen generation device according to claim 1 wherein the hardware processor is further configured to generate the remote operation screen provided that the operation screen is a predetermined operation screen.

9. The screen generation device according to claim 1, wherein the hardware processor is further configured to determine a predetermined area of the remote operation screen to be the first area and determines an area other than the first area to be the second area when the proportion of the aspect ratio of the display surface of the first display unit to the aspect ratio of the display surface of the second display unit is larger than the second threshold and smaller than the first threshold.

10. A remote operation device comprising the screen generation device according to claim 1, wherein the first device is a remote control device, and the remote operation device further comprises:

the second display unit; and a hardware processor configured to:

acquire a size of the first display unit from the remote control device including the first display unit; and receive an operation screen from the remote control device.

11. The remote operation device according to claim 10, wherein the hardware processor includes a position detecting unit and a position converting unit, and the hardware processor is further configured to:

detect a position of the display surface of the second display unit with the position detecting unit;

convert the position detected by the position detecting unit into a position in the operation screen corresponding to the size-changed screen with the position converting unit when a position in the size-changed screen included in the first area of the remote operation screen is detected by the position detecting unit in a state in which the remote operation screen is displayed by the second display unit;

determine a hard key associated with a soft key image arranged at a position detected by the position detecting unit when a position in the hard key screen included in the second area of the remote operation screen is detected by the position detecting unit in a state in which the remote operation screen is displayed by the second display unit; and transmit position information indicating the position in the operation screen resulting from the conversion by the position converting unit to the remote control device, and transmit key identification information for identifying the hard key determined by the hardware processor to the remote control device.

12. A remote control device comprising the screen generation device according to claim 1, wherein the second device is a remote operation device, and the remote control device further comprises:

the first display unit; and the hardware processor configured to:

acquire a size of the second display unit from the remote operation device including the second display unit; and transmit the generated remote operation screen to the remote operation device.

13. A screen generation method executed by a screen generation device, the screen generation method comprising:

determining one of a vertical direction and a horizontal direction to be a reference direction on the basis of an aspect ratio of a display surface of a first display unit and an aspect ratio of a display surface of a second display unit;

acquiring an operation screen to be displayed on the first display unit;

generating a size-changed screen by changing a size in a dependent direction of the acquired operation screen, the dependent direction being a direction different from the determined reference direction, wherein the dependent direction is one of a vertical direction and a horizontal direction;

acquiring key information on one or more hard keys;

generating a hard key screen in which one or more soft key images associated with the one or more hard keys, respectively, are arranged on the basis of the acquired hard key information;

generating a remote operation screen in which the size-changed screen and the hard key screen are arranged;

in the remote operation screen, determining a first area on the basis of the size-changed screen of the remote operation screen and determining an area other than the first area to be a second area;

in the remote operation screen, arranging the size-changed screen in the first area and the hard key screen in the second area; and in the remote operation screen, arranging one or more soft key images in the hard key screen, wherein the hard key screen is the same size as the second area, wherein positions of soft key images are determined based on respective pieces of hard key information;

wherein in the size-changed screen, respective spaces between display components in the operation screen are reduced in only one of the vertical direction and the horizontal direction according to the aspect ratio of the display surface of the first display unit and the aspect ratio of the display surface of the second display unit, and the display components are reduced at a predetermined magnification;

wherein the reference direction is determined to be the vertical direction when a proportion of the aspect ratio of the display surface of the first display unit to the aspect ratio of the display surface of the second display unit is equal to or larger than a first threshold or the reference direction is determined to be the horizontal direction when a proportion of the aspect ratio of the display surface of the first display unit to the aspect ratio of the display surface of the second display unit is equal to or smaller than a second threshold;

wherein the first threshold and the second threshold are values ensuring a minimum size of the second area in the remote operation screen.

14. A non-transitory recording medium storing a computer readable program which generates a screen and is executed by a computer configured to control a screen generation device, the program causing the computer to execute the steps of:
   determining one of a vertical direction and a horizontal direction to be a reference direction on the basis of an aspect ratio of a display surface of a first display unit and an aspect ratio of a display surface of a second display unit;
   acquiring an operation screen to be displayed on the first display unit;
   generating a size-changed screen by changing a size in a dependent direction of the acquired operation screen, the dependent direction being a direction different from the determined reference direction, wherein the dependent direction is one of a vertical direction and a horizontal direction;
   acquiring key information on one or more hard keys;
   generating a hard key screen in which one or more soft key images associated with the one or more hard keys, respectively, are arranged on the basis of the acquired hard key information;
   generating a remote operation screen in which the size-changed screen and the hard key screen are arranged;
   in the remote operation screen, determining a first area on the basis of the size-changed screen of the remote operation screen and determining an area other than the first area to be a second area;
   in the remote operation screen, arranging the size-changed screen in the first area and the hard key screen in the second area; and
   in the remote operation screen, arranging one or more soft key images in the hard key screen, wherein the hard key screen is the same size as the second area, wherein positions of soft key images are determined based on respective pieces of hard key information;
   wherein in the size-changed screen, respective spaces between display components in the operation screen are reduced in only one of the vertical direction and the horizontal direction according to the aspect ratio of the display surface of the first display unit and the aspect ratio of the display surface of the second display unit, and the display components are reduced at a predetermined magnification;
   wherein the reference direction is determined to be the vertical direction when a proportion of the aspect ratio of the display surface of the first display unit to the aspect ratio of the display surface of the second display unit is equal to or larger than a first threshold or the reference direction is determined to be the horizontal direction when a proportion of the aspect ratio of the display surface of the first display unit to the aspect ratio of the display surface of the second display unit is equal to or smaller than a second threshold;
   wherein the first threshold and the second threshold are values ensuring a minimum size of the second area in the remote operation screen.

15. A screen generation device comprising a hardware processor configured to:
   generate a sized-changed screen based on an operation screen displayed on a first display surface of a first device,
   wherein in the size-changed screen, respective spaces between display components in the operation screen are reduced in only one of a vertical direction and a horizontal direction according to an aspect ratio of the first display surface and an aspect ratio of a second display surface of a second device, and the display components are reduced at a predetermined magnification,
   wherein the only one of the vertical direction and a horizontal direction is determined based on whether the aspect ratio of the first display surface of the first device and the aspect ratio of the second display surface of the second device is equal to or larger than a first threshold, or whether the aspect ratio of the first display surface of the first device and the aspect ratio of the second display surface of the second device is equal to or smaller than the first threshold,
   wherein the first threshold and the second threshold are values ensuring a minimum size of the second area in the second display surface of the second device;
   generate a hard key screen in which soft key images associated with respective hard keys of the first device are arranged;
   determine a first area for displaying the size-changed screen in the second display surface; and
   determine a second area for displaying the hard key screen in an area other than the first area in the second display surface.

* * * * *